United States Patent [19]
Scholtz

[11] Patent Number: 6,009,132
[45] Date of Patent: Dec. 28, 1999

[54] SYSTEM AND METHOD FOR OBTAINING CLOCK RECOVERY FROM A RECEIVED DATA SIGNAL

[75] Inventor: William H. Scholtz, Middletown, N.J.

[73] Assignee: Globespan Semiconductor, Inc., Red Bank, N.J.

[21] Appl. No.: 09/045,434

[22] Filed: Mar. 20, 1998

Related U.S. Application Data

[60] Provisional application No. 60/053,767, Jul. 25, 1997.

[51] Int. Cl.$^6$ ....................................................... H04L 7/00
[52] U.S. Cl. ........................... 375/355; 375/371; 375/375
[58] Field of Search ..................... 375/355, 371, 375/375, 346, 326, 226, 254

[56] References Cited

U.S. PATENT DOCUMENTS

| | | | |
|---|---|---|---|
| 4,495,477 | 1/1985 | Weber | 332/10 |
| 5,278,865 | 1/1994 | Amrany et al. | 375/8 |
| 5,465,412 | 11/1995 | Mueller et al. | 455/296 |
| 5,703,904 | 12/1997 | Langberg | 375/232 |
| 5,703,905 | 12/1997 | Langberg | 375/232 |

*Primary Examiner*—Stephen Chin
*Assistant Examiner*—Mohammad Ghayour
*Attorney, Agent, or Firm*—Thomas, Kayden, Horstemeyer & Risley

[57] ABSTRACT

A system for the evaluation of a timing vector to determine whether reliable timing recovery may be established at a predetermined center frequency, or from a specific pilot tone in the received signal. According to the present invention, the timing vector is created using band edge filters, a pilot tone timing recovery band pass filter, or other suitable means. The timing vector is then sampled a predetermined number of times. The sampled timing vectors are plotted on a complex plane to evaluate the general distribution of the sampled timing vectors. Timing recovery is then established using an acceptable timing vector as determined by comparing the distribution of the sampled vectors with a predetermined distribution threshold. In particular, a narrow distribution indicates minimum of signal noise, interference, or disruption, whereas a wide distribution indicates the opposite. The instant invention also includes a means of evaluating the timing vector at several center frequencies in the case of band edge timing recover until an acceptable timing vector is found.

35 Claims, 23 Drawing Sheets

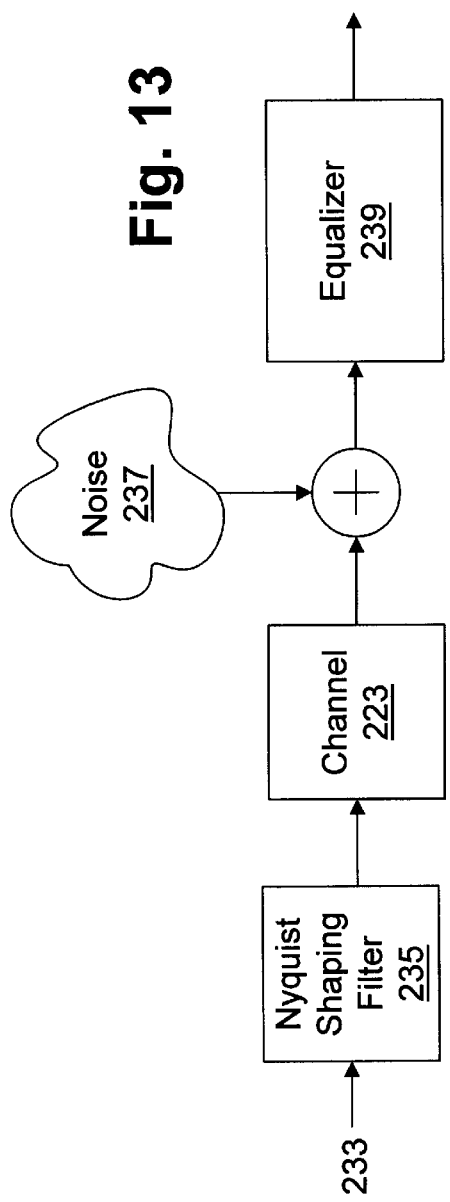
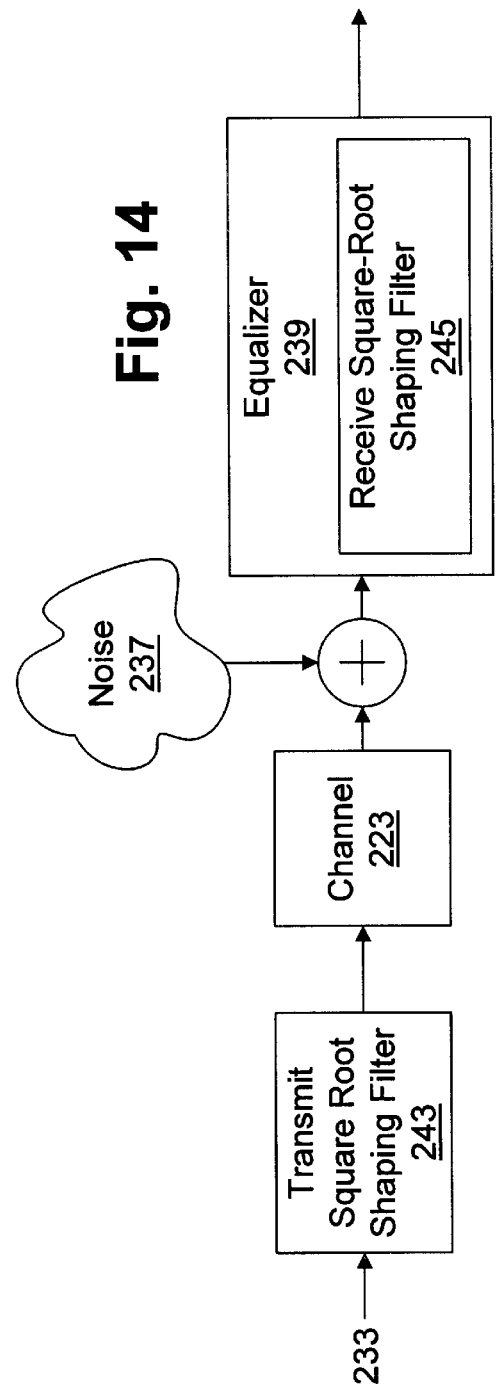

SYSTEM AND METHOD FOR OBTAINING CLOCK RECOVERY FROM A RECEIVED DATA SIGNAL

CROSS REFERENCE TO RELATED APPLICATIONS

This application claims the benefit of co-pending United States provisional patent application entitled "Communication System with Expanded Bandwidth and Improved Timing Recovery" filed on Jul. 25, 1997 and afforded Ser. No. 60/053,767.

FIELD OF THE INVENTION

The present invention relates to the field of data communication, and more particularly, to data communication as it pertains to clock recovery in conjunction with a digital subscriber line.

BACKGROUND OF THE INVENTION

The speed of data communication is being pushed to ever increasing rates. The advent of Digital Subscriber Lines (DSL) now makes data communication in the megabit-per-second range possible across existing copper wire links between subscriber modems and central office modems in the public switched telephone network (PSTN).

As known to those skilled in the art, a central office provides individual subscribers with access to the PSTN. In most cases, a subscriber is linked to the central office via a twisted pair of copper wires. The central office provides an interface between the subscriber to the PSTN.

In order to facilitate DSL communication, a DSL modem is included in the link at the central office to communicate with a DSL modem used on the subscriber end of the two wire pair. DSL provides high-speed multimedia services which can operate hundreds of times faster than traditional analog telephone modems.

DSL comes in several different configurations. One is the Asymmetric Digital Subscriber Line (ADSL) which provides data rates of 32 kbps to 8.192 Mbps, while simultaneously providing telephone phone service. Also, Rate Adaptive Asymmetric Digital Subscriber Line (RADSL) is much like ADSL, only it allows bandwidth adjustment to fit the particular application and to accommodate the length and quality of the line. In particular, the data rate of a RADSL may be adjusted downward to accommodate a longer distance to the central office. Other configurations include High-bit-rate Digital Subscriber Line (HDSL), Symmetric Digital Subscriber Line (SDSL), and Very high-bit-rate Digital Subscriber Line (VDSL).

While DSL provides much higher rates of data communication, it is not without problems. In particular, at the higher frequencies used in DSL communication, the traditional two wire interface may not provide a reliable pathway or channel through which the data signal can travel. Often times, an interfering signal may be induced onto the two wire channel from a second two wire in close channel proximity. Such a signal might be from a second DSL modem that is communicating to the same central office.

Another problem may be the quality of the two wire channel itself. High frequency traffic generally experiences greater attenuation in the two wire channels. Also, interconnections that occur in the channel may degrade or loosen over a period of time, causing noise and further signal degradation.

As a result, data communication using DSL is becoming more susceptible to interference that causes disruption of the data signal. As more and more digital subscriber lines are installed, the probability of interference among two wire channels increases. Also, as the existing copper two wire network gets older, the quality of the channels will further degrade. Additionally, as DSL gains in popularity, it is likely that subscribers who are located greater distances away from central offices will desire DSL service due to its faster data communication rates. However, the longer distance results in greater signal attenuation as there is more opportunity for degradation, interference, and disruption of the data signal.

All of these problems may affect the quality of DSL signals transmitted across the two wire pairs. In particular, the information sent from which timing recovery of the data signal is determined at a particular center frequency in the receiving modem may be diminished or lost. However, it is now possible to send timing recovery information across a broad frequency spectrum in which timing recovery information may be recovered at any number of center frequencies along the spectrum.

However, the problems of signal degradation, interference, and disruption may compromise the timing recovery information received at any one of the number of center frequencies along the transmission frequency spectrum. In such a case, timing recovery cannot be established at such center frequencies and the receiver will have to randomly search through several possible center frequencies until timing recovery is established.

This hit and miss approach will cause an intolerable delay in the startup of data communication. Consequently, there is a need for a DSL receiver which can quickly evaluate timing recovery information received at various center frequencies to determine whether timing recovery may be reliably established.

SUMMARY OF THE INVENTION

The present invention involves a system and method for evaluation of a timing vector to determine whether reliable timing recovery may be established. The system includes the creation and evaluation of a timing vector to determine the amount of interference and signal disruption at a predetermined center frequency. According to the preferred embodiment, logic is included to determine the center frequency at which the timing vector is to be evaluated. A band edge filter is then employed to create the timing vector at the center frequency specified. According to a second embodiment, a timing vector is created from a pilot tone.

Next, the timing vector is sampled a predetermined number of times by a timing vector evaluator, thereby resulting in several sampled timing vectors which are stored for analysis. The timing vector evaluator includes logic whereby the distribution of the sampled timing vectors on a complex plane is evaluated to determine the quality of the timing vector itself. In particular, a narrow distribution is indicative of less noise, interference, or disruption of the data signal thereby indicating an acceptable timing vector. A wide distribution is indicative of greater noise, interference, or disruption of the data signal thereby indicating a not acceptable timing vector.

In accordance with the invention, there is disclosed a method of generating and evaluating a timing vector to determine the quality of data transmission at a specific center frequency. The method includes the steps of generating a timing vector, sampling the timing vector, and then evaluating the quality of the timing vector by examining the sampled timing vectors. The step of evaluating the sampled timing vectors further includes examining the distribution of the sampled timing vectors on the complex plane. Next the instant method includes determining whether the timing vector is acceptable based on the distribution of the sampled timing vectors.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 13 is a block diagram illustrating a communication channel with a Nyquist filter;

FIG. 14 is a second block illustrating a communication channel with a Nyquist filter;

DETAILED DESCRIPTION OF THE PREFERRED EMBODIMENT

Figure 1:
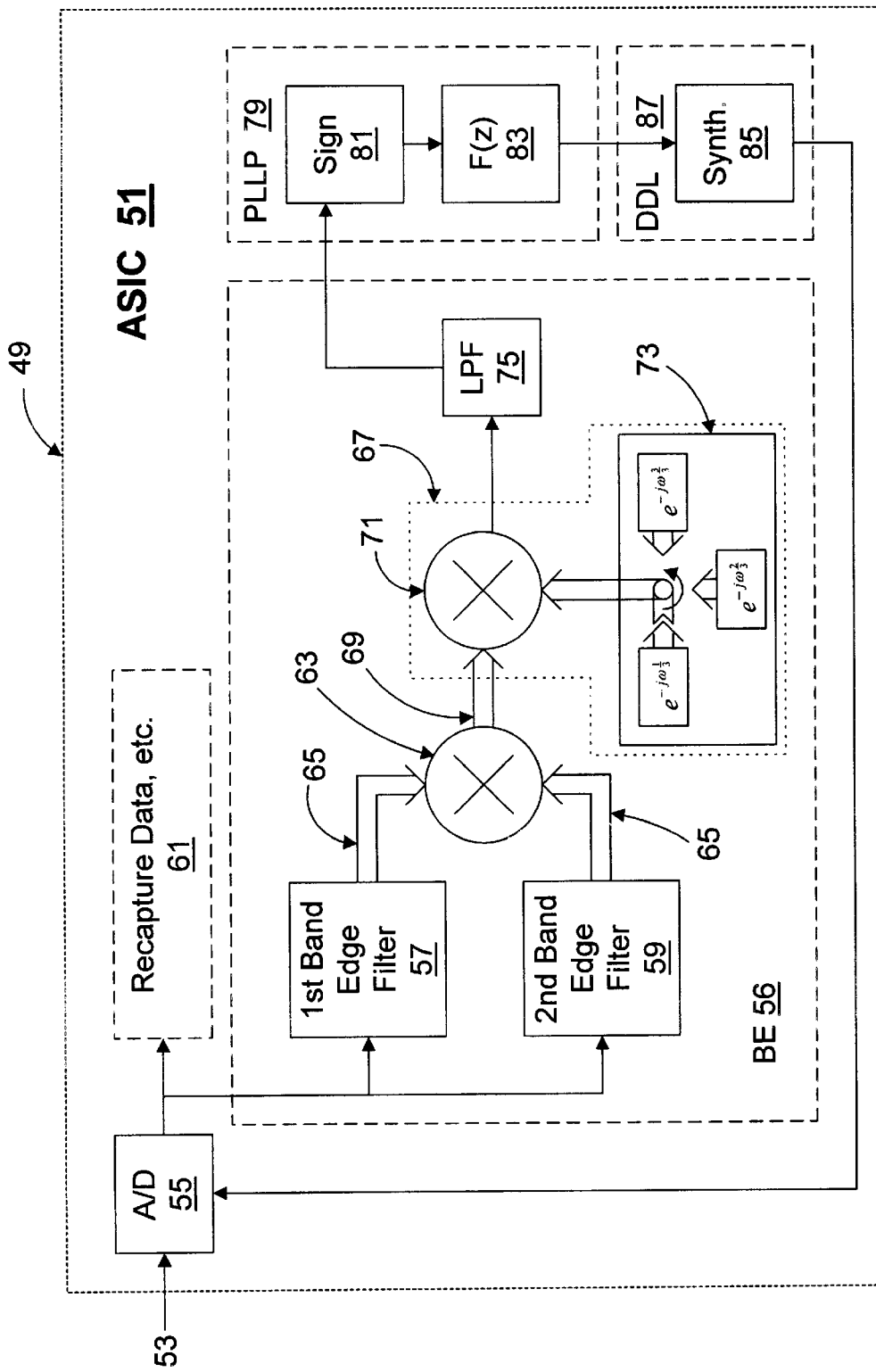
FIG. 1 is a block diagram illustrating the major components of a band edge timing recovery system according to the prior art.

Turning to FIG. 1, shown is a band edge timing recovery system 49 according to the prior art. The band edge timing recovery system 49 is comprised chiefly of an application specific integrated circuit (ASIC) 51. The ASIC 51 includes several different sub-components which may include several microprocessors or digital signal processors, which are generally termed "engines" by those skilled in the art, as well as several other digital logic circuits. In particular, ASIC 51 features a data signal input 53 which is fed into an analog-to-digital (AID) converter 55. In the preferred embodiment, the A/D converter 55 over-samples the data input by three times the symbol rate. This over-sampled signal will be modulated to the symbol rate as will be described.

The analog-to-digital converter 55 is in electrical communication with a Band Edge (BE) engine 56, which contains first and second band edge filters 57 and 59 as well as other digital circuitry 61 designed to reassemble the data from the data signal. For the purposes of this application, the digital circuitry 61 is not materially relevant to the operation of the timing recovery system of the present invention, is understood by persons skilled in the art, and need not be discussed in detail.

The first and second band edge filters 57 and 59 are also labeled "analytical" filters which feature a complex response to the digital signal input provided by the analog-to-digital converter 55 as known by those skilled in the art. The output of the first and second band edge filters 57 and 59 are in electrical communication with multiplier 63 via a first complex communication pathway 65. The first complex communication pathway 65 enables the communication of both the real and the imaginary components of the complex response of the first and second band edge filters 57 and 59. The resulting output of the multiplier 63 is a timing tone as known by those skilled in the art. This timing tone corresponds in frequency to the bit rate of the data signal input 53.

The multiplier 63 is in electrical communication with demodulator 67 via second complex communication pathway 69. The demodulator 67 serves to restore the over sampled data signal to the symbol rate. In particular, each complex sample is multiplied by the second multiplier 71 a corresponding complex variable or vector $e^{-j\omega N/3}$ which causes the phase angle of the three complex samples to be the same. Note if FIG. 1 the three complex variables $e^{-j\omega N/3}$ are represented with a rotating switch 73 which advances with each complex sample received. The values of the resulting complex variables are then averaged to obtain a single complex sample.

The demodulator 67 is in electrical communication with a low pass filter 75 via the electrical communications pathway 77. The communication pathway 77 is disposed to communicate only the imaginary portions of the complex timing vector samples that result from the operation of the demodulator 67 as this provides the necessary phase information by taking the inverse sine of the imaginary portion. The low pass filter 75 serves to reduce any unwanted noise from the signal.

The phase information is then communicated to the Phase Locked Loop Processor (PLLP) 79. This engine features digital logic sign 81 and the accumulating function F(z) 83. The accumulating function F(z) 83 is in electrical communication with the synthesizer 85 which is located on and operated by a digital delay loop engine (DDL) 87. The sign 81 serves to detect the difference between the phase of the timing vector and the phase of the synthesized clock from the synthesizer 85, thereby resulting in a phase error. The phase error is then stored in the accumulating function F(z) 83 which in turn provides the error to the synthesizer 85. The synthesizer 85 will then conform the phase of its synthesized clock output so that the phase error is reduced to zero. Consequently, synthesized clock will be in phase with the timing vector of the incoming data signal 53. The synthesized clock is then used to trigger the sampling of the analog-to-digital converter 55. In a sense, the components of the PLLP 79 and the DDL 87 serve as a phase locked loop, which is well known to those skilled in the art.

Note that the above described circuit may be accomplished with configurations other than an application specific integrated circuit. For example, the engines described may exist on separate integrated circuits located on a single circuit board. Also, the functions of the PLLP 79 and the DDL 87 may be accomplished using a voltage controlled oscillator (VCO) or other similar circuitry as known in the art.

Figure 2A:
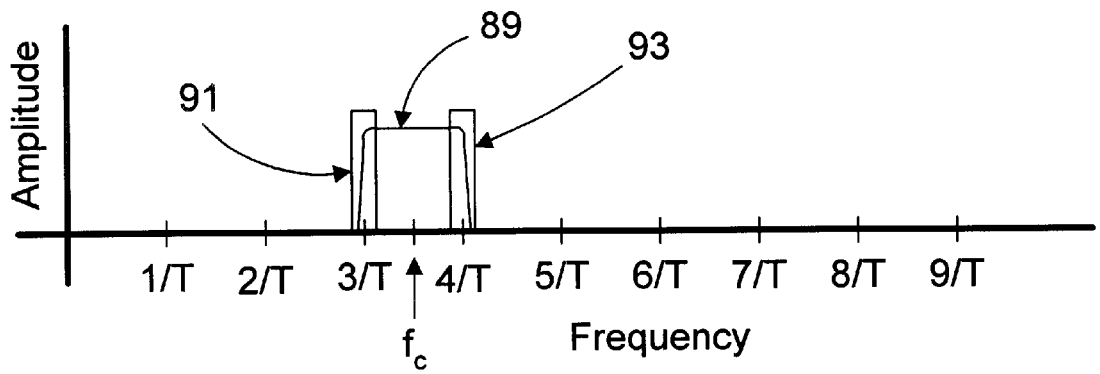
FIG. 2A is a graph showing a frequency spectrum of a data signal transmitted without an expanded bandwidth.

Referring next to FIG. 2A, we put the discussion of the previous timing recovery aside for a moment to discuss the frequency spectrum 89 of a data signal without bandwidth expansion as shown. The frequency spectrum 89 is shown with the frequency pass bands 91 and 93 of the first and second band edge filters 57 and 59 (FIG. 1). The frequency pass bands 91 and 93 are centered on the edges of the frequency spectrum which is 1/T wide, where T equals the symbol period of the data signal. Note that the frequency pass bands 91 and 93 are both equidistant from the center frequency $f_c$ of the frequency spectrum 89. The center frequency $f_c$ is generally defined as the frequency that is equidistant from both of the frequency pass bands 91 and 93 in a band edge filter.

Figure 2B:
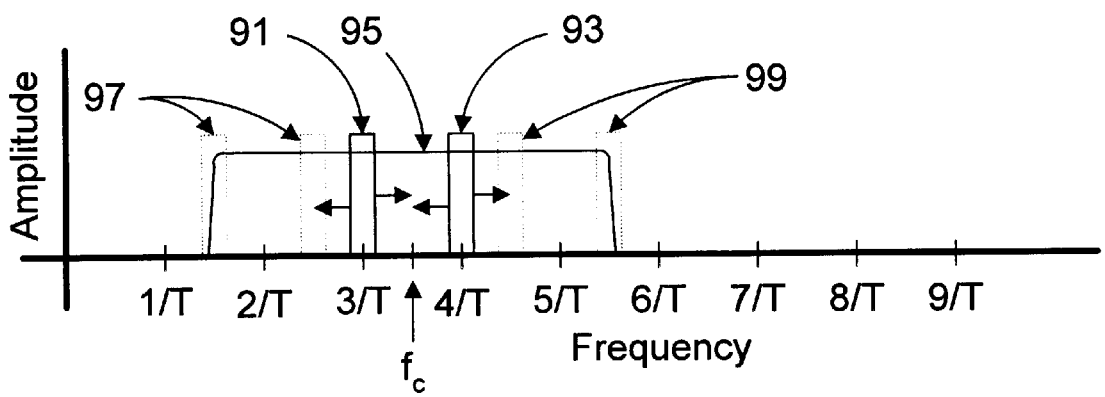
FIG. 2B is a graph showing a frequency spectrum of a data signal transmitted with an expanded bandwidth.

Turning to FIG. 2B, shown is the bandwidth 95 of a data signal which has been expanded ("expanded bandwidth"). A general explanation of bandwidth expansion is provided in U.S. patent application Ser. No. 08/953,082, entitled "System and Method for Optimizing High Speed Data Transmission," filed on Oct. 17, 1997, which is incorporated herein by reference in its entirety. Also, further explanation of the concept of bandwidth expansion is given later in this text.

Within the expanded bandwidth 95 are the frequency pass bands 91 and 93 of the first and second band edge filters 57 and 59 (FIG. 1). The expanded bandwidth 95 allows timing recovery throughout its entire spectrum. That is to say that the center frequency $f_c$ around which the frequency pass bands 91 and 93 are located may be shifted up and down the entire expanded bandwidth 95 as shown. Thus the frequency pass bands 91 and 93 may be located anywhere between the extreme left 97 or extreme right 99 of the expanded bandwidth 95 to gain timing recovery information provided that the frequency pass bands 91 and 93 are 1/T apart.

Referring back to FIG. 1, the problem with known timing recovery systems 49 is that they cannot obtain timing recovery at multiple center frequencies $f_c$ where the transmission data signal has been expanded as in FIG. 2A. Also, there is no ability to determine the precise quality of the timing vector at a given center frequency $f_c$. This means that such systems are unable to determine the center frequency that provides the best timing vector when there are two or more acceptable center frequencies at which to conduct data transmission.

Figure 3:
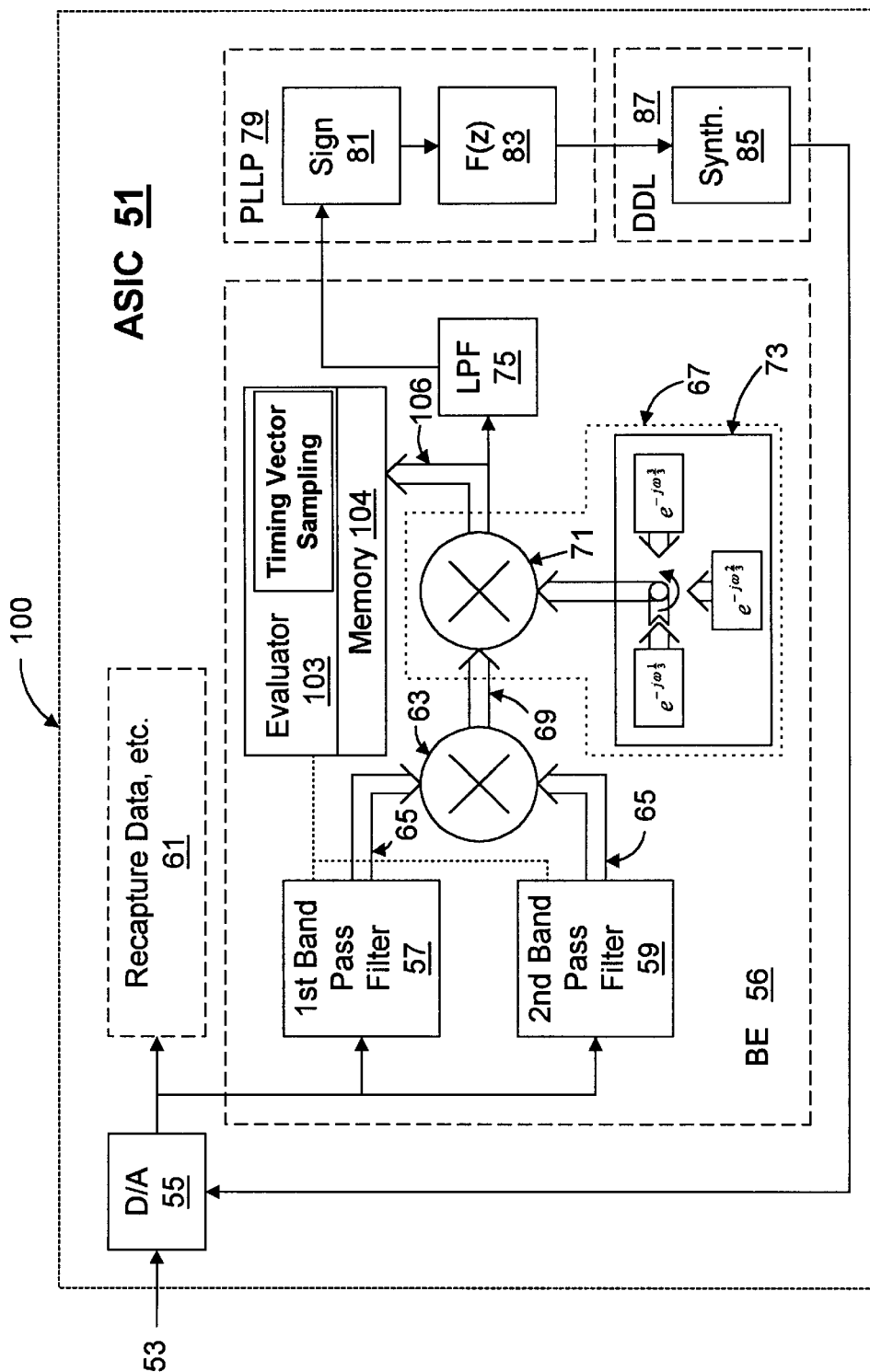
FIG. 3 is a block diagram illustrating the major components of a band edge timing recovery system according to the present invention.

Turning then, to FIG. 3, shown is a timing recovery system 100 according to the instant invention. According to the present invention, the BE engine 56 includes a timing vector evaluator 103 having a memory 104 which is receives the complex timing vector output from the second multiplier 71 of the demodulator 67 by a third complex communication pathway 106. The timing vector evaluator 103 is in electrical communication with the first and second band edge filters 57 and 59. These components provide the features of timing vector evaluation and control the selection of the center frequency according to the instant invention. Note, however, that the timing vector evaluator 103 may be located on engines other than the BE engine 56.

Before discussing the operation of the timing vector evaluator 103, a description of the nature of the timing vector as seen by the timing recovery system before the phase locking occurs is first provided. The actual phase angle of the timing vector is random at communication start-up. Generally noise is introduced to the data signal during transmission which will cause a deviation in the phase angle of the timing vector itself. Thus if the timing vector is sampled multiple times and the resulting sample timing vectors plotted on a complex plane, the result is generally a vector "cloud". The displacement or distribution of such a vector cloud is generally proportional to the amount noise and interference that the data signal experiences during transmission.

Figure 4:
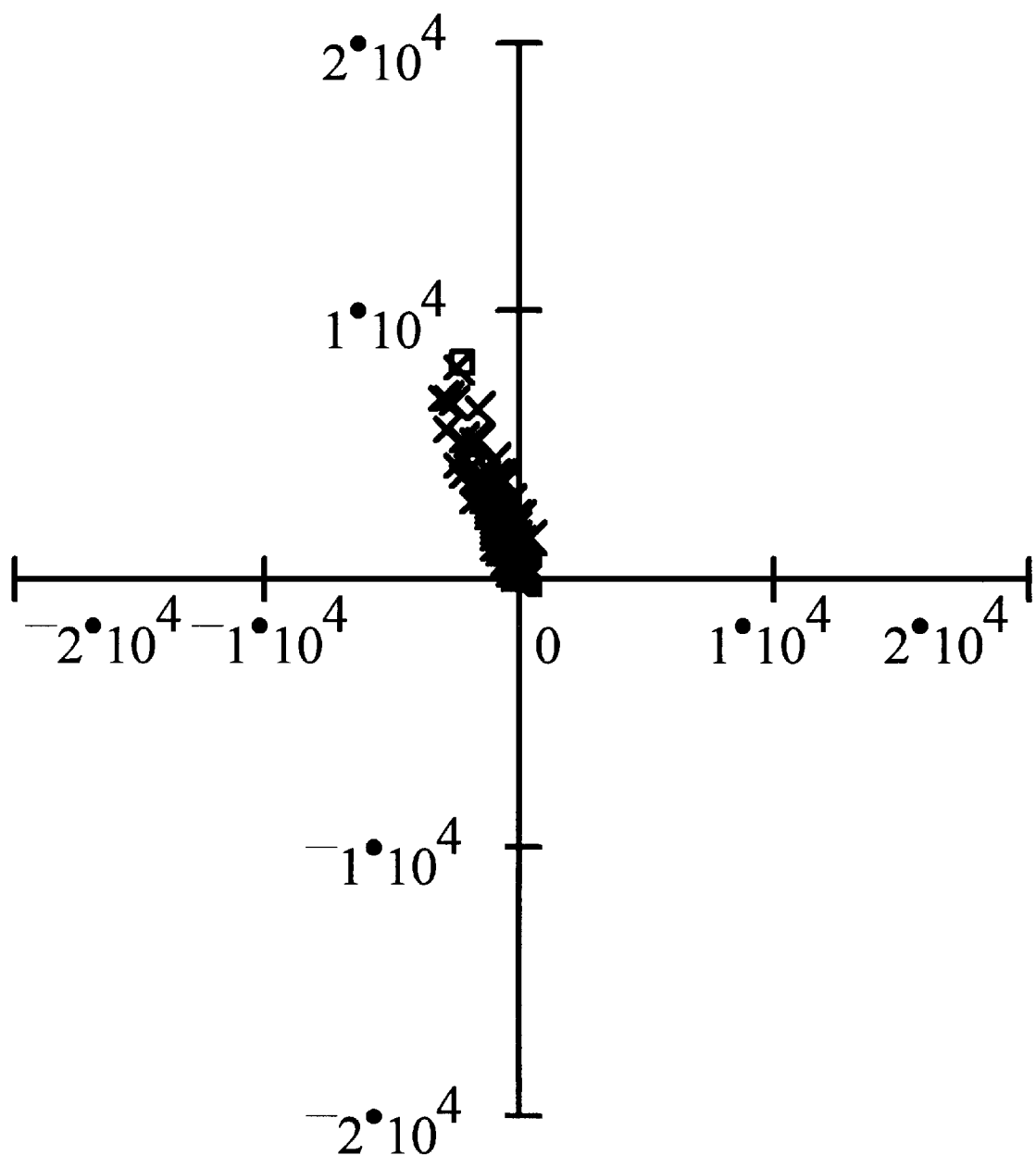
FIG. 4 is a graph showing the plot of the sampled timing vectors taken from a high quality timing vector.

Turning then to FIG. 4, shown is a graph which illustrates the plot of a first timing vector "cloud" 111. Specifically, the first timing vector cloud 111 is actually formed from plotting the tips of multiple timing vectors. These multiple timing vectors are obtained by sampling the timing vector output of the second multiplier 71 (FIG. 3). The first timing vector cloud 111 is of high quality as the distribution of the timing vector plots are relatively compact, the overall width of the cloud being relatively narrow. The first timing vector cloud 111 generally indicates a reliable timing vector which would provide good timing recovery during data communication.

Figure 5:
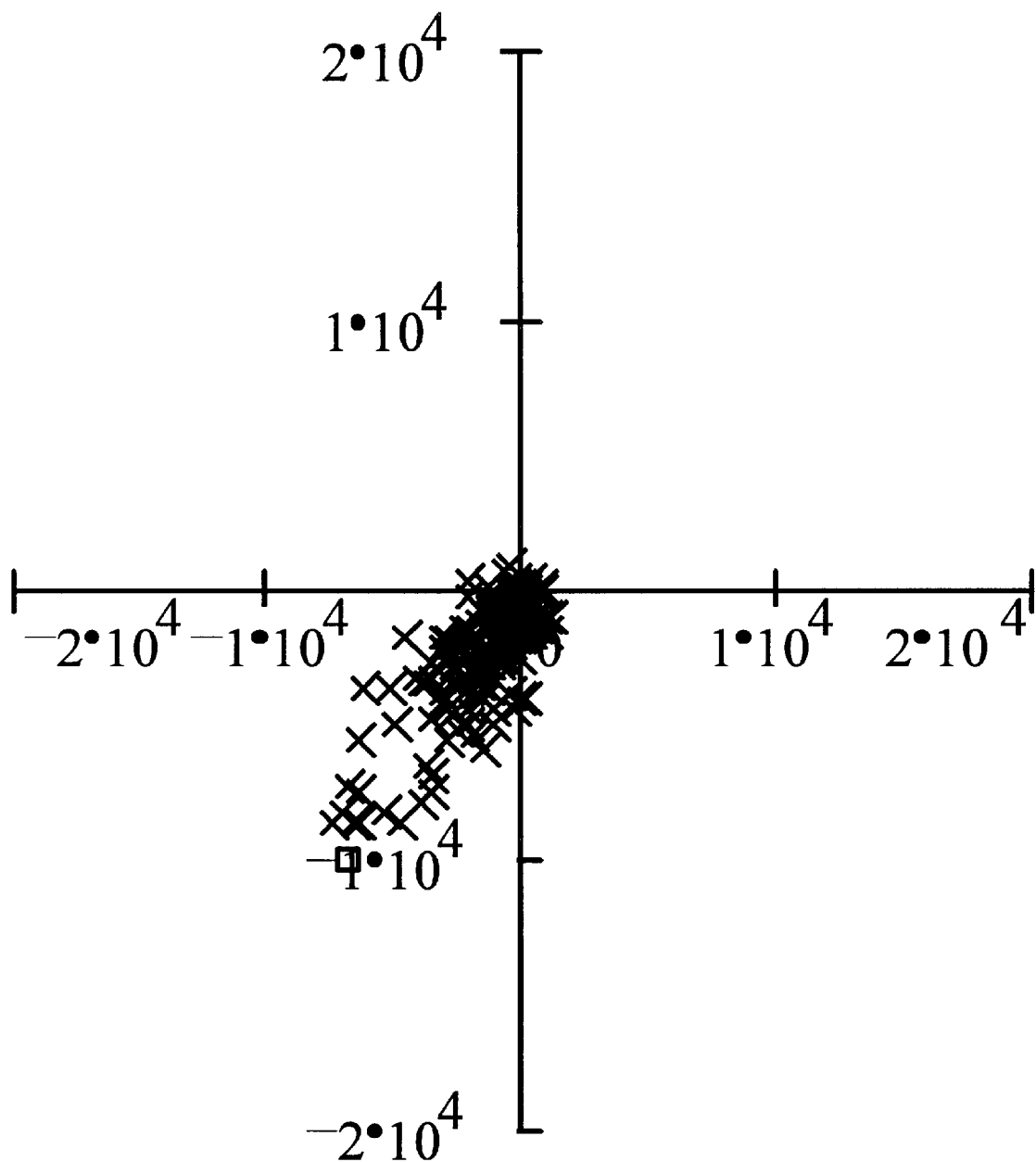
FIG. 5 is a graph showing the plot of the sampled timing vectors taken from a timing vector of medium quality.

Referring to FIG. 5, shown is a second timing vector cloud 113 of lesser quality than the first timing vector cloud 111 (FIG. 4), but still acceptable in that timing recovery may be achieved with such a timing vector. The distribution of the second timing vector cloud 113 with a significantly greater area than the first timing vector cloud 111 (FIG. 4) indicates that the sampled timing vector of FIG. 5 is experiencing greater interference or distortion in transmission. The reliability of this timing vector is thus in greater doubt as opposed to the timing vector from which the first timing vector cloud 111 (FIG. 4) is derived.

Figure 6:
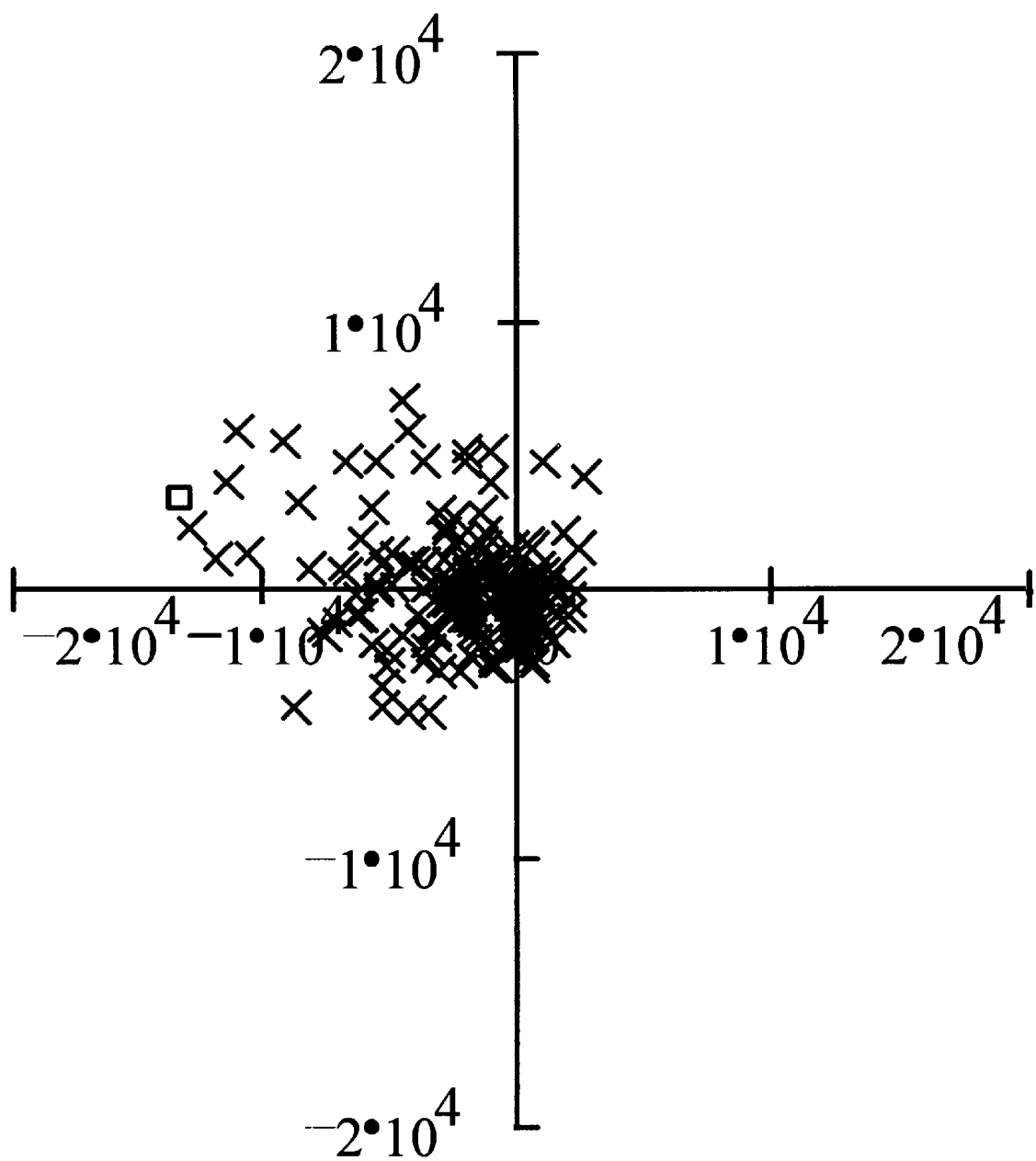
FIG. 6 is a graph showing the plot of the sampled timing vectors taken from a low quality timing vector.

Finally, turning to FIG. 6, shown is a third timing vector cloud 116 with a distribution showing area which is even greater still. This distribution of the third timing vector cloud 116 is the signature of a timing vector that will not allow timing recovery to be established by the timing recovery system 100. As shown, the plots of the sampled timing vectors of the third timing vector cloud 116 are placed in a more random fashion, indicating significant interference and distortion with the data signal received. Where a timing vector is of such poor quality as in FIG. 6, it would be desirable to switch to a different center frequency to see if a timing vector of greater quality may be obtained.

Figure 7A:
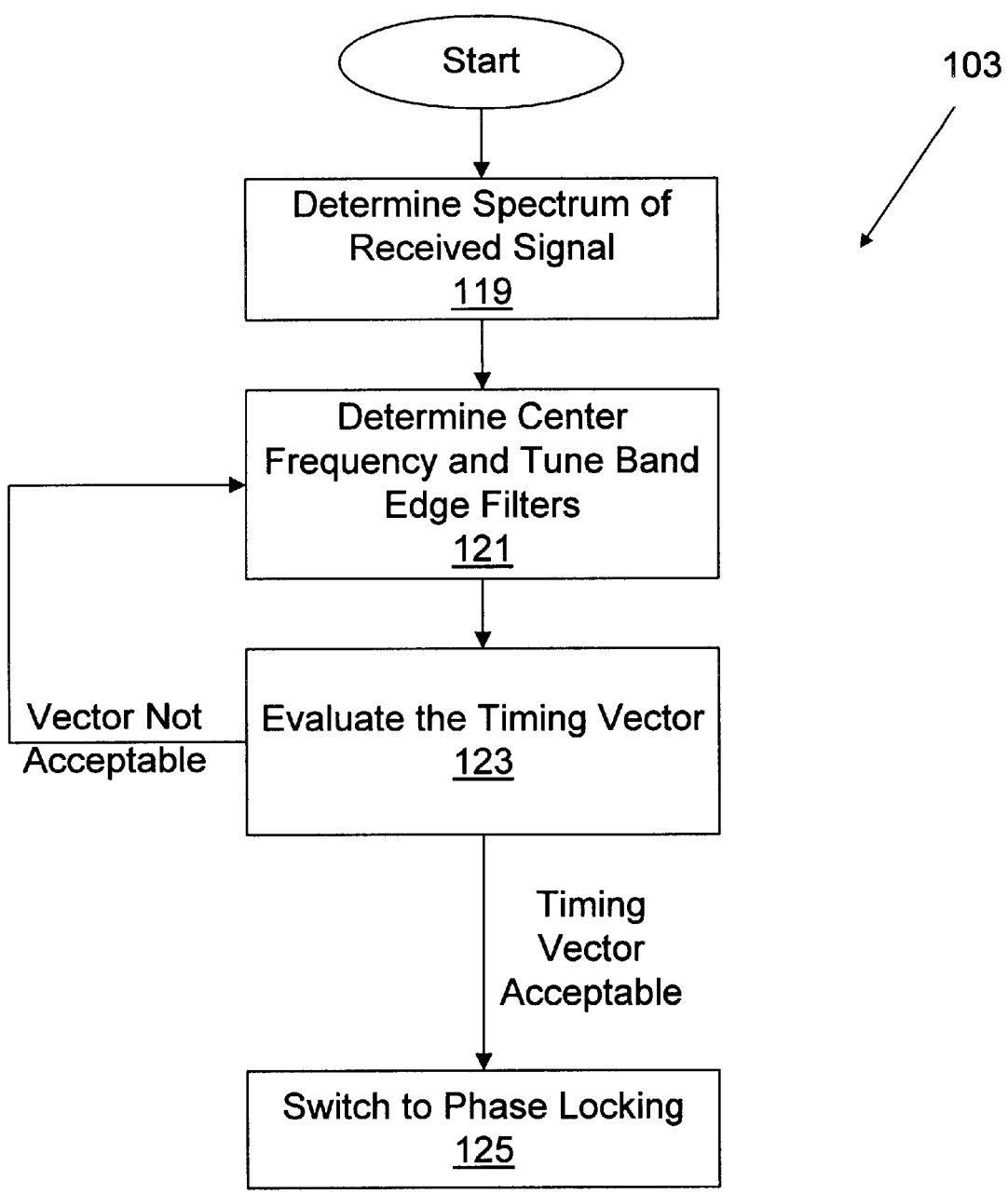
FIG. 7A is a flow chart illustrating the functional operation of the timing recovery system of FIG. 3.

Turning next to FIG. 7A, shown is a flow diagram 103 of the logic executed in evaluating the timing vector generated using band edge timing recovery. In block 119, the spectrum of the data signal is examined to determine the width of the expanded transmission bandwidth 95 (FIG. 2B). It should be understood, however, that block 119 may not be necessary as standard expanded transmission bandwidths 95 may be employed by a transmitter communicating to a receiver according to the present invention. In such a case, the actual bandwidth of the transmitted data signal may be assumed by the clock recovery system of the present invention.

Next, in block 121, the center frequency is determined at which the timing vector will be evaluated. Then, in the block 123, the timing vector is evaluated at the chosen center frequency. If the timing vector is not acceptable, then the logic reverts back to block 121 where a new center frequency is determined and the band edge filters are tuned to operate at the new center frequency. If the timing vector is acceptable, then the logic moves to block 125 where timing recovery is established by initiating phase locking.

The logic employed in block 121 to determine the center frequency at which one will operate may vary with the primary goal being to find the center frequency with the highest quality timing vector in the least amount of time. In one approach, several center frequencies may be identified at even intervals along the available frequency range. One might perform an analysis of the timing vector beginning at the bottom center frequency progressing upward choosing the next center frequency for evaluation by incrementing the previous center frequency evaluated by a predetermined amount, proceeding to the top center frequency of the band until a satisfactory timing vector is found.

In another approach, the center frequencies may be chosen starting at both the bottom and the top of the available bandwidth. In such a case center frequencies would be incremented by a predetermined amount at the bottom, and decremented by a predetermined from the top. The center frequency at which the timing vector is examined would alternate between the top and the bottom, the center frequency evaluation converging on the center of the band. This would allow faster timing recovery if the only acceptable timing vector may be obtained at a center frequency at the top of the expanded bandwidth, rather than waiting for the evaluation to progress across the whole spectrum as in the previous approach.

In yet another approach, one may specify that center frequencies be chosen within the available bandwidth at random until an acceptable timing vector is found. In such a case it would be preferable that every center frequency at which the timing vector is examined be stored in memory so that none are repeated. To the extent that the timing vector at a certain randomly chosen center frequency is marginally acceptable, it may be advantageous to guide the selection of further center frequencies from a region in the bandwidth near the marginal center frequency as the probability is greater than non-interference or minimal distortion may exist in such a region.

In yet another approach, a number of center frequencies may be chosen either in intervals across the expanded bandwidth, at random, or by some other method and each chosen center frequency may be evaluated for the quality of the timing vector. Once the quality of several timing vectors is known, the center frequency that provides the greatest quality timing vector may be chosen in order to perform timing recovery.

Figure 7B:
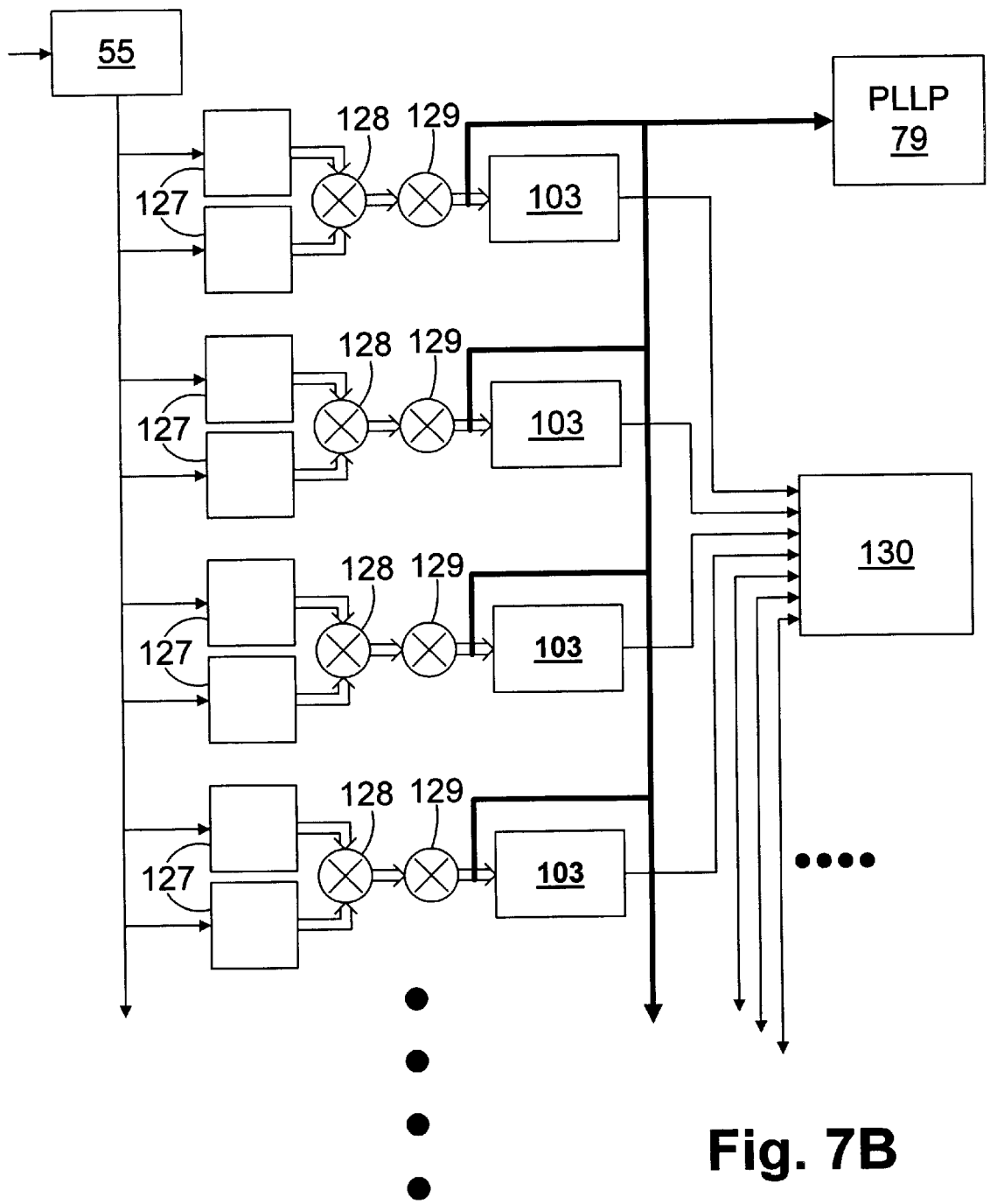
FIG. 7B is a schematic of a variation of the band edge timing recovery system of FIG. 3.

Turning to FIG. 7B, an entirely different approach entails the use of multiple pairs of band pass filters 127 tuned to many different center frequencies at a single time. In such a case, first and second band pass filters 57 and 59 (FIG. 3) would be repeated, all connected to the same output from the D/A converter 55. In other words, rather than a single pair of filters consisting of first and second band pass filters 57 and 59, multiple pairs of band pass filters may be employed, each pair having an input which receives the digital signal from the D/A converter 55. Such pairs of band pass filters would essentially filter the same data in real time. Likewise, pair of band pass filters would be accompanied by corresponding multipliers 128 and 129, along with a corresponding timing vector evaluator 103 to evaluate the timing vectors of each pair of band pass filters 127. Ultimately, in such a circuit, the quality of the timing vector at several different center frequencies may be determined simultaneously. The quality of each timing vector evaluated by the timing vector evaluators 103 is then provided to timing vector decider 130 which will decide which is the best timing vector. Based on the decision, the timing vector decider 130 will allow one of the pairs of band pass filters 127 to provide timing information to the PLLP 79.

The number of band pass filters and other components employed in this configuration will vary depending on how many may be employed on a single ASIC 51 (FIG. 3). Also, a lesser number of multipliers 128 and 129 or evaluators 103 may be employed than are pairs of band pass filters 127. In such a case, the functions of the multipliers 128 and 129, or the evaluators 103 are distributed to two or more pairs of band pass filters 127. The use of multiple components as in FIG. 7B will allow the evaluation of timing vectors to proceed much more quickly.

There are many different ways to determine at which center frequencies should the timing vector be evaluated for reliable data transmission. The primary goal would be to find the most reliable timing vector in the least amount of time. It is intended that such approaches be included herein.

Figure 8:
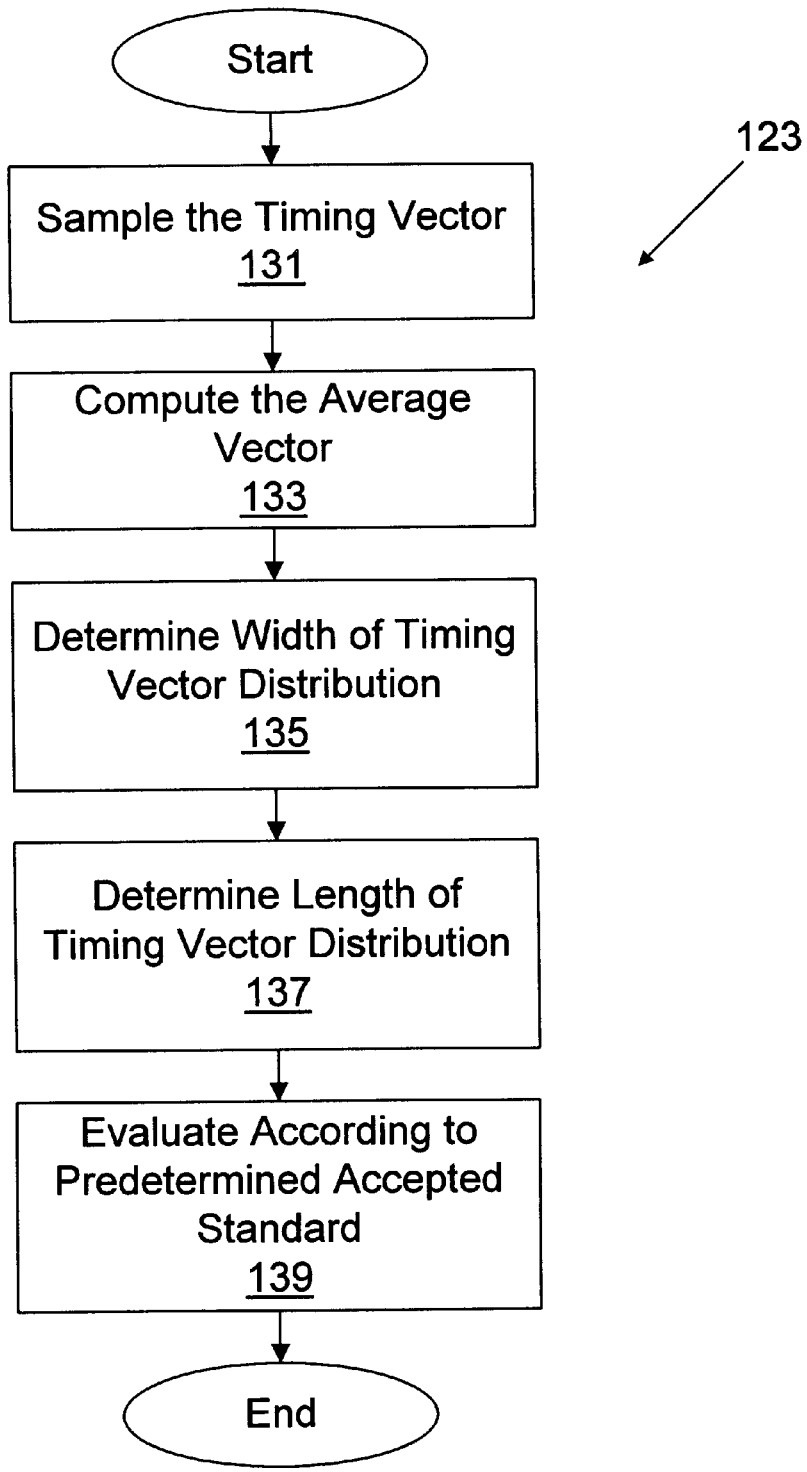
FIG. 8 is a flow chart illustrating the functional operation of one of the blocks in the flow chart of FIG. 7A.

Turning next to FIG. 8, shown is a flow diagram 123 of the functional operation of the timing vector evaluator in evaluating the timing vector according to the preferred embodiment. Beginning with block 131, the timing vector is sampled a predetermined number of times, the samples being stored in memory 104. It may be likely that samples at adjacent points in time will result in adjacent vectors. Therefore, one may under sample the data without loss of information.

Next, in block 133, the reference vector is computed from the vector samples taken in block 131. In the preferred embodiment, the reference vector is the resulting average vector of both the sum of the real and imaginary components of the complex sampled vectors, each divided by the predetermined number of vectors. In a first alternative, the reference vector is the longest vector which is encountered. In a second alternative, the reference vector may be the distance between the end of the longest vector in the case of the preferred embodiment and the end of the vector which is furthest away from the longest vector. Note that it is possible that the number of sampled vectors necessary to compute the reference vector should be as small as possible to save on processing time, but should be large enough to ensure that the reference vector calculated is reasonably accurate.

Figure 9:
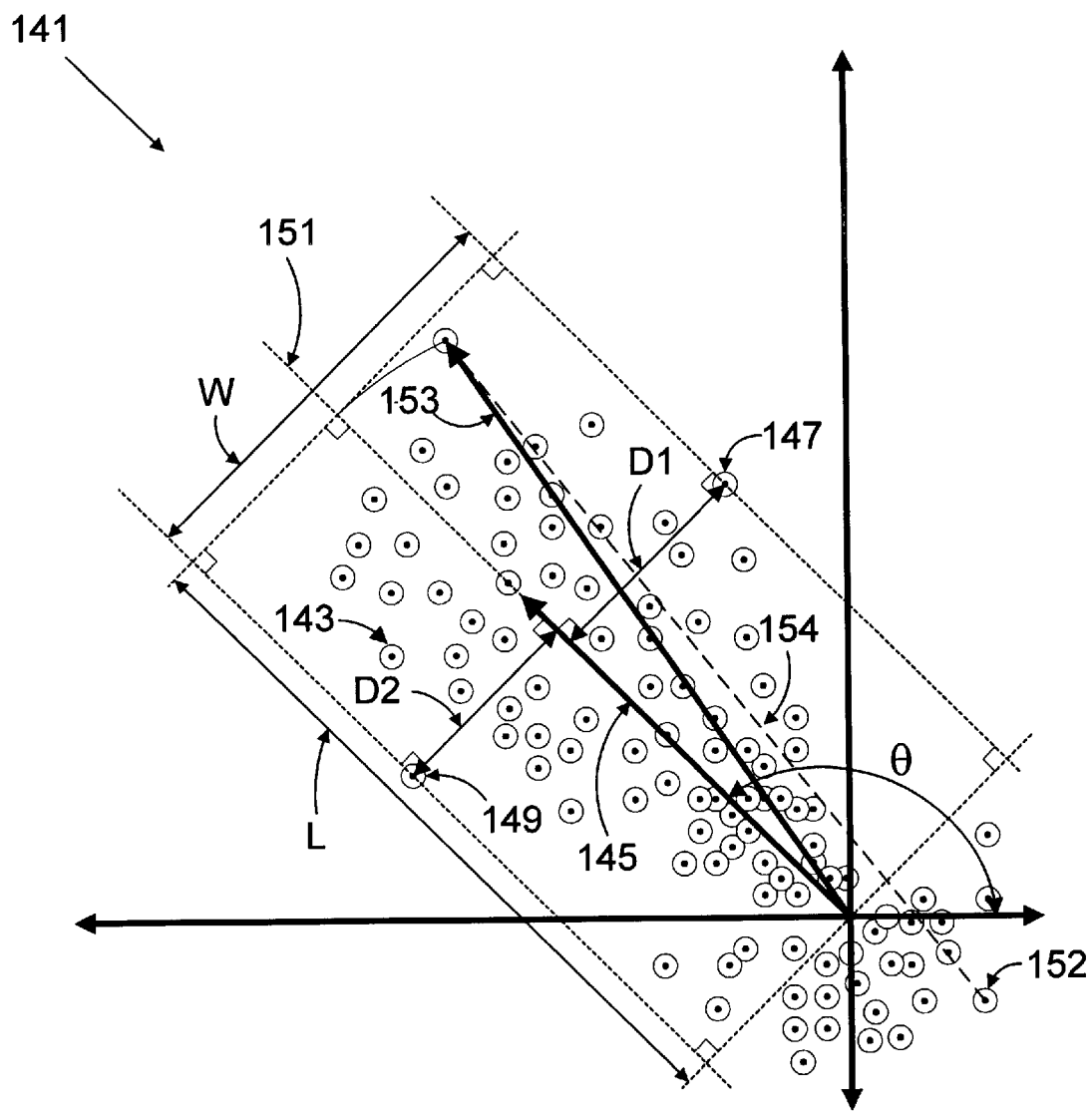
FIG. 9 is a drawing illustrating a sampled timing vector distribution according to the present invention.

In block 135, the maximum width of the sampled vector distribution perpendicular to the to the reference vector is determined. This function is described with reference to FIG. 9, which shows a sampled vector distribution 141 with the real and imaginary axes 142 and 144 of the complex plane. Also shown are several sampled vectors 143 along with the average reference vector 145 which is situated by angle θ from the positive real axis 144. Note that one may use the longest vector 153 in place of the average vector 145. Also, once the longest vector 153 is known, one may determine the farthest point 152 away from the end of the longest vector 153, thereby resulting in an axis 154 which may be used in place of the average vector as discussed previously. In order to find the width of the sampled vector distribution 141, first and second perpendicular sampled vectors 147 and 149 are determined. The first perpendicular sampled vector 147 is that which lies the maximum perpendicular distance D1 away from the reference vector axis 151 in the clockwise direction. Likewise, the second perpendicular sampled vector 149 is that which lies the maximum perpendicular distance D2 away from the reference vector axis 151 opposite the first perpendicular sampled vector 147. The overall width W of the sampled vector distribution 141 is then determined by adding the two maximum distances D1 and D2. Note that the maximum distances D1 and D2 may be determined by calculating the perpendicular distance for each sample vector and storing the highest number calculated.

Turning back to FIG. 8, once the width of the timing vector distribution is determined, block 137 is executed in which the overall length of the sampled vector distribution is determined. Referring back to FIG. 9, according to the preferred embodiment, the length L of the sampled vector distribution 141 is approximated by determining magnitude of the longest sampled vector 153. It may also be possible to determine the component length of the longest sampled vector 153 that lies along the reference vector axis.

Turning back once again to FIG. 8, in block 139, the distribution represented by the width W and the length L (FIG. 9) is evaluated. According to the preferred embodiment, the ratio of the W/L is compared to a predetermined threshold ratio of a sampled timing vector distribution 141 (FIG. 9) which provides a threshold measurement for an acceptable timing vector distribution. Where the magnitude of the ratio is low, it indicates a narrow distribution with minimal noise. Where the magnitude of the ratio is high, it indicates a wide distribution with significant noise and interference. Thus, in determining the threshold ratio, one skilled in the art should balance the fact that a low number is desirable to ensure detection of a reliable timing vector along with the fact that too low a number might make it difficult to find an acceptable timing vector with which to effect timing recovery. A suggested threshold may be on the order of 0.8 to 1 and is a function of the quality of the phase locked loop employed, however, it is understood that the threshold is not limited to such a value in the preferred embodiment. For example, if the reference vector 154 (FIG. 9) is used, it may be possible that an acceptable ratio could be as high as 2. It may be necessary to run several timing vector iterations to determine the precise ratio that indicates an acceptable timing vector. This could be done by determining the quality of a timing vector while introducing a known amount of noise onto a transmission channel. Several iterations could be performed where the amount of noise is incremented each time until the threshold ratio is found.

Pilot Tone

Figure 10A:
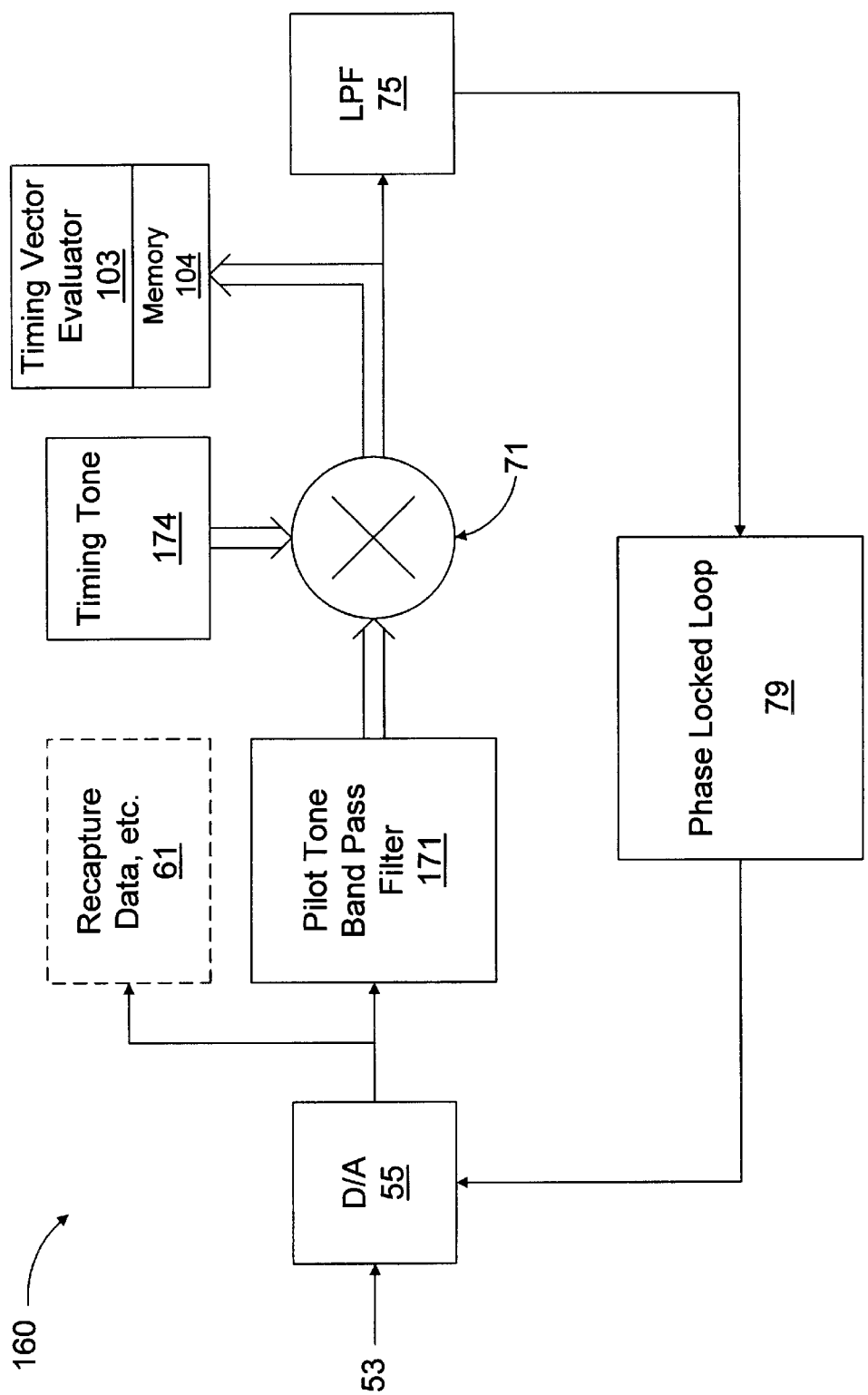
FIG. 10A is a block diagram illustrating the major components of a pilot tone timing recovery system according to the present invention.

In the following, the above concepts relating to the evaluation of a timing vector are discussed as they apply to the use of a pilot tone. Turning to FIG. 10A, shown is a pilot tone timing recovery circuit 160 according to a second embodiment of the present invention. As with band edge recovery, the incoming data stream 53 is once again fed into D/A converter 55. The digital information is then fed to the pilot tone band pass filter 171 which produces a complex output. The complex output of the pilot tone band pass filter 171 is then fed into the multiplier 71. Also fed into the multiplier 71 is a timing tone 174. The resulting output of the multiplier is then fed through low pass filter 75 and then to the phase locked loop 79. The output of the phase locked loop 79 is then fed into the D/A converter 55, thereby triggering the sampling function of the D/A converter 55.

As was the case with band edge recovery, the timing vector evaluator 103 is added to the pilot tone timing recovery circuit 160 in order to evaluate the quality of the complex timing vector output of the multiplier 71. The timing vector evaluator 103 may include logic that will dictate whether data transmission will continue depending on the quality of the timing vector evaluated.

Figure 10B:
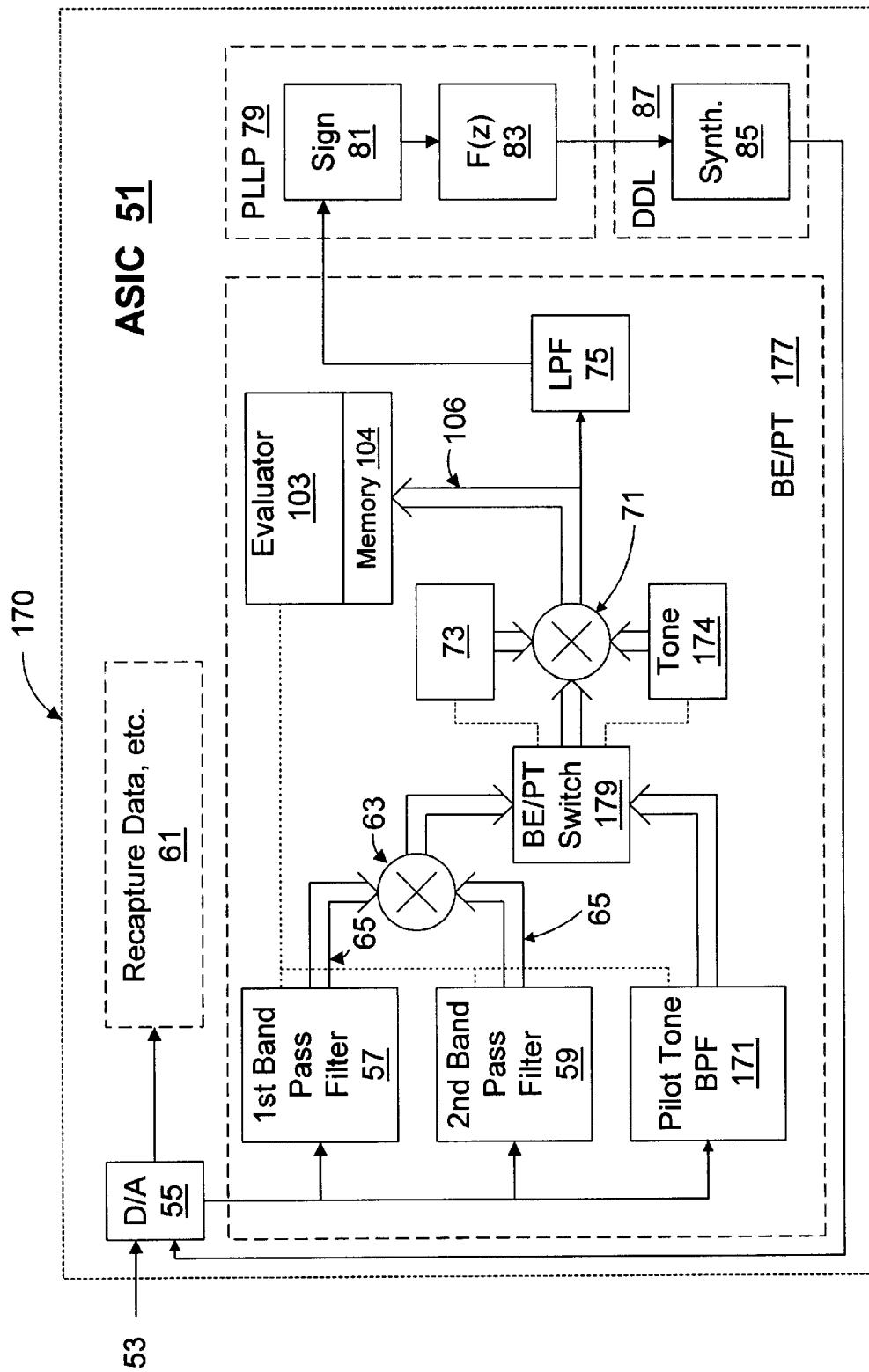
FIG. 10B is a block diagram illustrating the major components of dual band edge and pilot tone timing recovery system according to the present invention.

Referring then to FIG. 10B, shown is a block diagram of the pilot tone timing recovery system 170 which incorporates both band edge and pilot tone timing recovery. In this embodiment, timing recovery may be established using either a band edge or a pilot tone, depending upon which is more reliable. In FIG. 10B, a band edge/pilot tone (BE/PT) engine 177 includes the pilot tone band pass filter 171 along with the first and second band pass filters 57 and 59 discussed in the previous section. The complex output of the pilot tone band pass filter 171 is fed into the band edge/pilot tone (BE/PT) switch 179. Also fed into the BE/PT switch 179 is the complex output of the band edge multiplier 63. The switch is set depending upon whether the timing vector of either a band edge or pilot tone is to be evaluated by the timing vector 103. If the switch is set for band edge recovery, then the rotating switch 73 (see FIG. 3) is active and fed into the multiplier 71. If the switch is set for pilot tone timing recovery, then the timing tone 174 is active and fed into the multiplier 71. The resulting complex timing vector 106 for either band edge or pilot tone timing recovery is fed into the timing vector evaluator 103. The timing vector evaluator 103 may include logic to control whether band edge or pilot tone timing recovery is to be used, or such logic may be executed elsewhere in the circuit.

Figure 11:
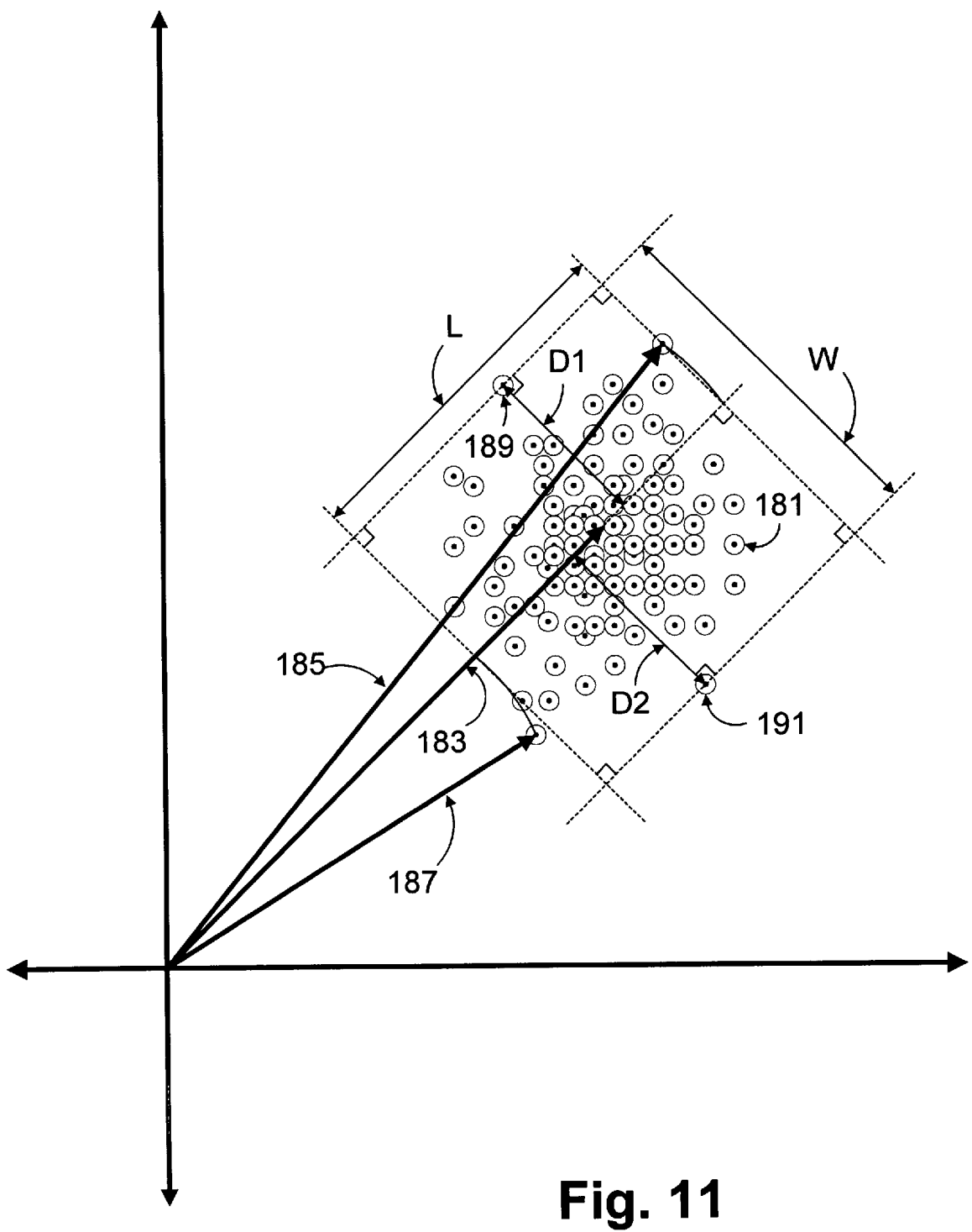
FIG. 11 is a drawing illustrating a sampled timing vector distribution for a pilot tone according to the present invention.

Turning to FIG. 11, shown is a pilot tone timing vector distribution analyzed by the timing vector evaluator 103. It has been discovered that the distribution of a timing vector from a pilot tone timing recovery system will generally revolve around a fixed point some distance from the origin. A good pilot tone timing vector cloud forms within a generally compact circle around the point. A bad pilot tone timing vector forms large circle that is much less compact. Thus, to evaluate the pilot tone timing vector, one need only to determine the general area of the distribution and compare this area to a predetermined threshold area of acceptability.

To further illustrate, in FIG. 11, shown is a distribution of sampled vectors 181. The distribution is generally circular in nature. According to the logic of the timing evaluator 103 (FIG. 10A), first, a reference vector is determined. In the case of the second embodiment, the reference vector 183 is obtained by taking an average of all of the vectors 181. After the reference vector 183 is determined, the next step is to determine the longest vector 185 and the shortest vector 187 relative to the origin of the complex plane. The length of the shortest vector 185 is subtracted from the longest vector 187 to obtain the length L of the vector distribution.

The width W of the distribution is then determined by first finding a first vector 189 which is the longest perpendicular distance D1 above the reference vector 183 on the complex plane. Next a second vector 191 is found which is the longest perpendicular distance D2 below the reference vector 183. The width W of the distribution is then determined by adding D1 and D2. The width W is multiplied by the length L to obtain an area which is then compared with a predetermined threshold area of acceptability. The timing vector is deemed acceptable or unacceptable on this basis.

It is also possible that it is possible that a data signal may be created that has multiple timing tones. In such a case, the timing vector evaluator 103 further includes logic to determine which timing tone will be filtered by the pilot tone band pass filter 171 in order to obtain a timing vector for evaluation. The logic which determines the specific timing vector is chosen may be configured to any one of a number of variations. For example, specific pilot tones can be chosen randomly or sequentially, as well as other schemes which are similar to the discussion of choosing a center frequency in the case of band edge filtering.

Bandwidth Expansion

Figure 12:
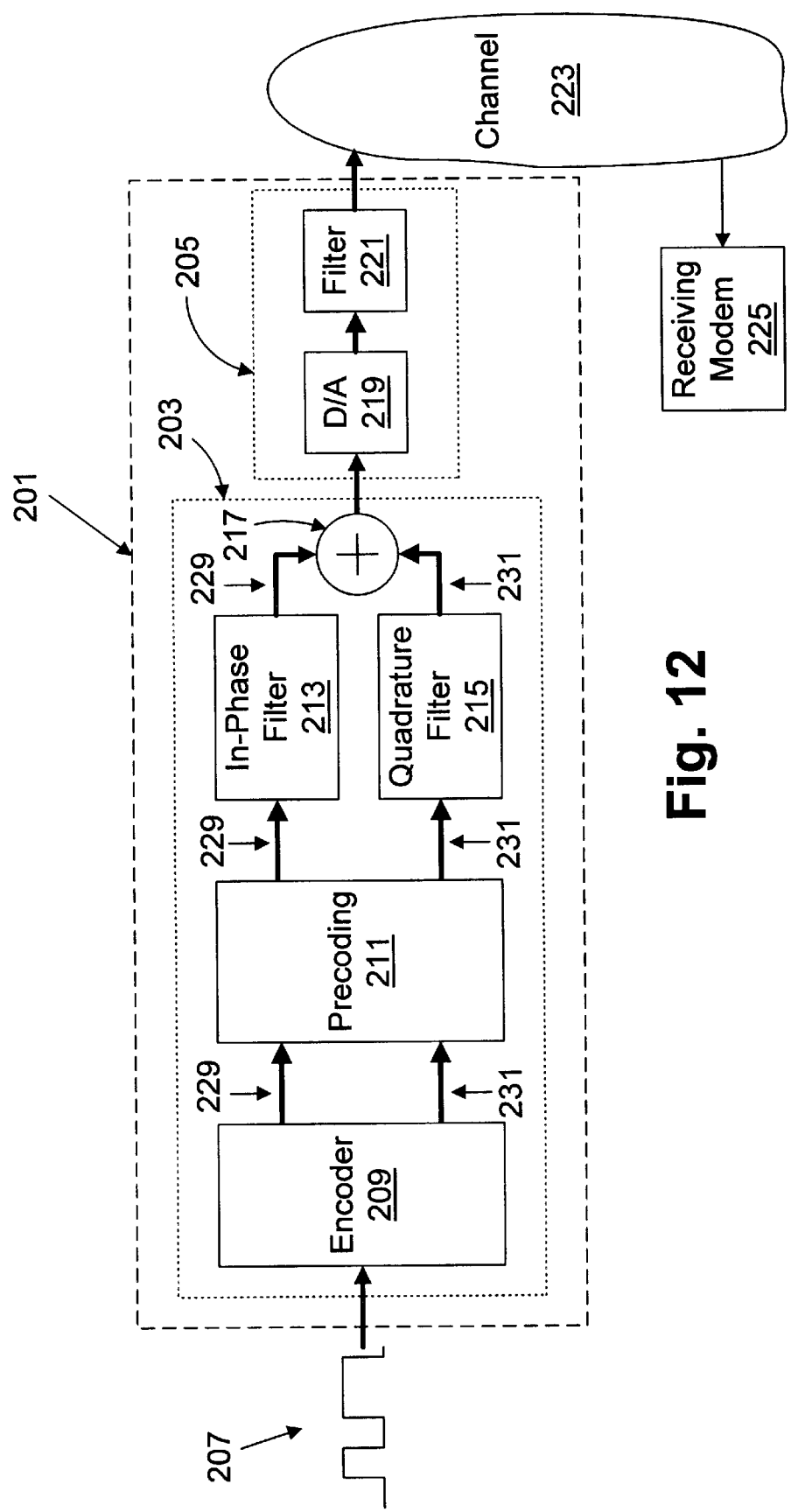
FIG. 12 is a block diagram of the operational components of a modem according to the preferred embodiment.

At this point, a further explanation of the concept of bandwidth expansion of a data transmission signal is discussed in detail in order to foster a greater understanding of the instant invention. Turning to FIG. 12, shown are the major physical and functional data transmission components of a modem 201 transmitting a data signal with an expanded bandwidth. The primary physical components include an application specific integrated circuit (ASIC) 203 and a separate integrated circuit 205. The ASIC 203 contains several digital signal processors which operate according to specific programs as well as dedicated circuits as known to those skilled in the art. The data input 207 is that which is generated by a computer or other electronic device to be communicated. The data input 207 is routed to a dedicated circuit on the ASIC 203 which performs as an encoder 209. The encoder 209 is electrically coupled to digital signal processors resident on the ASIC 203 which are programmed with logic to perform as the precoder 211, in-phase filter 213, quadrature filter 215, and the adder 217. The ASIC 203 is electrically coupled to a digital to analog converter 219 and an output filter 221, both of which are resident on the separate integrated circuit 205. The output of the adder 217 is channeled to the digital to analog converter 219 through this electrical coupling. The output from the filter 221 is transmitted through the channel 223 which represents the communication pathway for the data communication to the receiving modem 225.

To describe the general operation of the above system, the encoder 209 receives a data signal 207 from a computer or other device as known by those skilled in the art. The encoder 209 then generates a discrete in-phase signal 229 and a discrete quadrature signal 231. This is known as Carrierless Amplitude Modulation/Phase Modulation (CAP) to those skilled in the art.

The discrete values of both the in-phase and quadrature signals 229 and 231 are generated using modulation techniques in which several points on a modem constellation correspond to specific sequences of bits of the incoming data signal as known to those skilled in the art. The number of different discrete values which may be employed by the in-phase and quadrature signals 229 and 231 depends on the particular constellation employed. Any one of several different constellations may be used ranging from 8 to 2209 points in powers of 2. The operation of the encoder 209 will not be discussed in detail as it is an expedient well within the understanding of those skilled in the art.

The precoder 211 processes the in-phase and quadrature signals 229 and 231 so as to pre-distort the transmitted signal in accordance with channel characteristics learned during channel training. Generally, the receiver is trained when data communication is established and the receiving modem 225 will send precoder filter coefficients to the transmitting modem 201. The function of the precoder 211 is an expedient understood by those skilled in the art and is not discussed in detail here.

Once conditioned by the precoder 211, the in-phase signal 229 is processed by the in-phase transmission filter 213 and the quadrature signal 231 is processed by the quadrature transmission filter 215. The in-phase and quadrature filters 213 and 215 are finite-impulse-response (FIR) digital filters. The in-phase filter 213 and the quadrature filter 215 are also known as "shaping" filters. This is because one purpose of the filters 213 and 215 is to alter the shape of the discrete in-phase and quadrature signals 229 and 231 to a form which may be transmitted within a limited bandwidth of frequencies at a predetermined center frequency. In other words, the in-phase and quadrature filters 213 and 215 place the resulting signals in the desired frequency band.

Turning to FIG. 13, shown is a block diagram that shows the filtering functions in relation to the channel. The data signal 233 is processed by the Nyquist shaping transmit filter 235 before being transmitted across the channel 223. The Nyquist shaping transmit filter 235 represents the functions performed by both the in-phase filter 213 (FIG. 12) and the quadrature filter 215 (FIG. 12). During transmission through the channel 223, noise 237 is introduced into the data signal 233. The equalizer 239 serves to recover the signal transmitted through the channel by minimizing signal distortion that may occur due to the impulse response of the channel 223. Also, the equalizer 239 will minimize noise 237 introduced in the channel 223 by preventing noise from folding back into the transmitted signal. FIG. 13 is an example of a transmission filter which is localized on the transmitter side of the channel 223.

Referring to FIG. 14, shown is an example of a distributed shaping filter. Rather than localize the function of the shaping filter on the transmit side of the channel as in FIG. 13, the configuration of FIG. 14 features both a transmit square root shaping filter 243 and a receive square-root shaping filter 245 within equalizer 239. Whereas the function of the Nyquist shaping filter 235 (FIG. 13) might be expressed as G(f), the function of both the transmit square-root filters 243 and 245 can be written as $\sqrt{G(f)}$. With regard to the Nyquist shaping, the square-root filter 243 and 245 are essentially the same. In the configuration of FIG. 14, the cascade of the two square-root shaping filters 243 and 245 provides the desired Nyquist shaping filter as the total impulse response of cascaded filters as such is found by multiplying them together where $\sqrt{G(f)} \times \sqrt{G(f)} = G(f)$. Note that the square-root shaping filter 245 is incorporated within the logic executed by the equalizer 239 and is not a separate filter. Generally, incorporation of a such filter within the logic of an equalizer is and expedient known to those skilled in the art.

Figure 15:
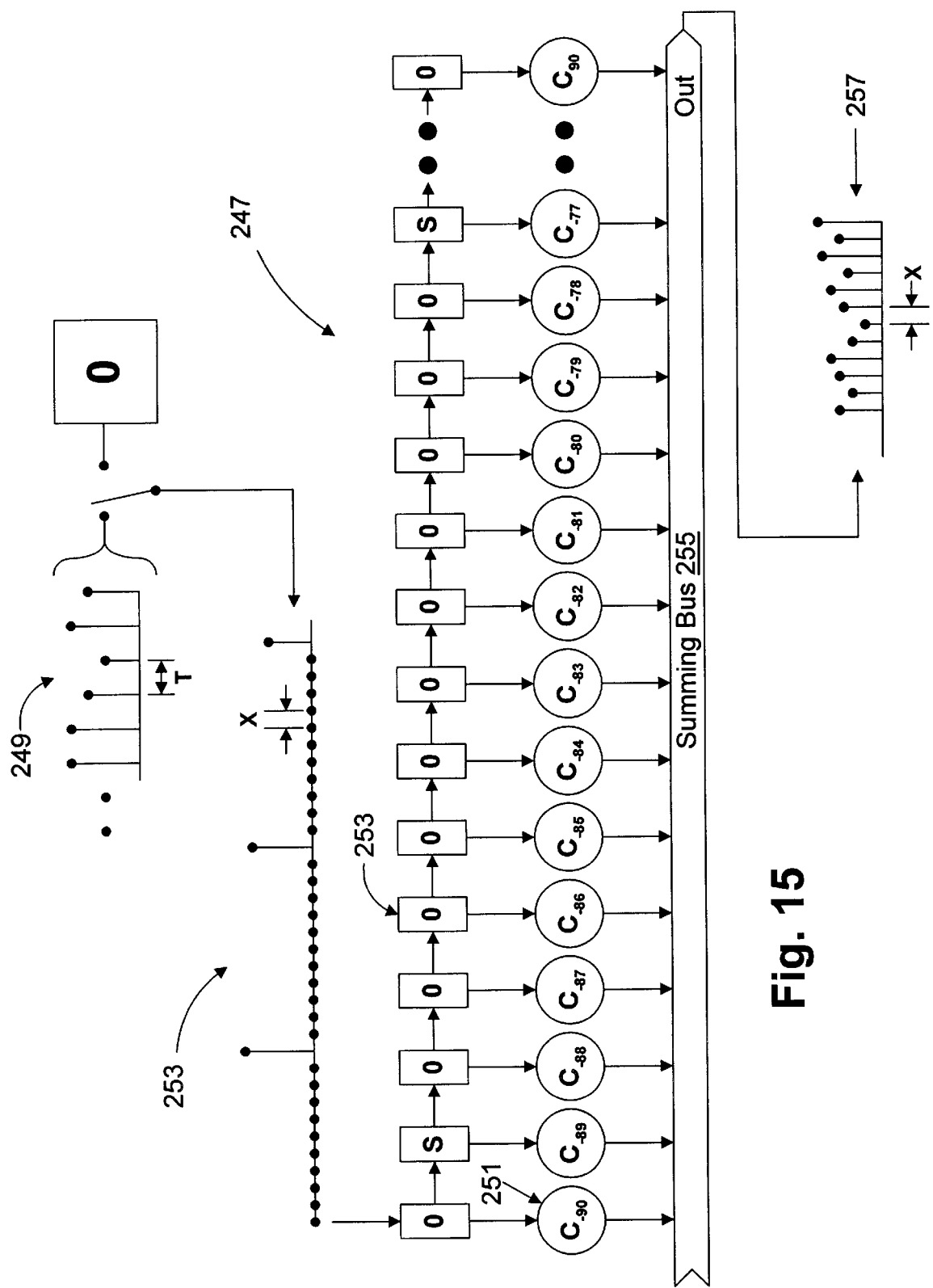
FIG. 15 is a drawing illustrating the operation of the in-phase filter and the quadrature filter depicted in FIG. 12.

Referring to FIG. 15, shown is a diagram that illustrates a digital filter 247 of the type used for either the in-phase filter 213 (FIG. 12) or the quadrature filter 215 (FIG. 12). The symbols 249 are the discrete values of the in-phase signal 229 (FIG. 12) or the quadrature signal 231 (FIG. 12) before they are input into the in-phase filter 213 or the quadrature filter 215. The symbols are separated in time by the symbol period T. As the symbols 249 are read into the filter 247, they are subjected to an upsampling process. Essentially, the upsampling process involves the injection of zero samples between the symbols to achieve a higher sample rate. In the frequency domain, the upsampling process results in the repetition of the baseband signal every 1/T. The upsampling process described herein is an expedient well known to those skilled in the art and is not discussed in detail.

After the upsampling process, the resulting signal is comprised of samples 253 separated by a sample period X. To clarify, the symbol period T relates to the time between the original symbols 249. The sample period X relates to the time between the samples 253 after the upsampling process. In a sense, the symbols 249 are converted to samples 253 after the upsampling process. In FIG. 15, the samples 253 are then fed into the digital filter 247. The digital filter 247 is a finite impulse response filter of the type $$y(t) = C_0 x(t) + C_1 x(t-1) + C_2 x(t-2) + \ldots + C_n x(t-n).$$

The coefficients $C_n$ 251 are multiplied by the samples 253 and summed together at the summing bus 255. The samples 253 are separated in time by the sample period X. After each summing operation is performed, the samples 253 are shifted and a new sample 253 is injected into the digital filter 247. The output of the summing operation is the discrete signal 257. This particular digital filter is described here as an example to provide background. The digital filter is configured so that only coefficients are multiplied by an actual sample and summed at the summing bus 255. This speeds up the processing time. Such configurations are well known to those skilled in the art and will not be described herein.

The FIR filter coefficients 251 are found using the square root shaping filter G(f) mentioned previously. To determine the coefficients 251 for the in-phase filter 213, the impulse response of a square-root Nyquist baseband filter is first defined. Generally, such a response should comply with Nyquist criteria which are known to those skilled in the art. The impulse response g(t) chosen for the Nyquist filtering is a square root raised-cosine which is placed in both the transmitter and receiver as in FIG. 14, where a raised cosine function h(t) is given as $$h(t) = \left(\frac{\sin(\pi t/T)}{\pi t/T}\right)\left(\frac{\cos(\alpha \pi t/T)}{1 - (2\alpha t/T)^2}\right).$$

The square-root raised-cosine pulse g(t) is then expressed as $$g(t) = \frac{\sin[\pi(1-\alpha)t'] + 4\alpha t'\cos[\pi(1+\alpha)t']}{\pi t'[1 - (4\alpha t')^2]}$$

where $t' = t/T$ and $\alpha$ is defined as the excess bandwidth.

Note that although the impulse response of a square-root raised cosine is not the only which will suffice in this instance. Other impulse responses which may be used include the raised cosine itself and others known by those skilled in the art.

Next, a center frequency, $f_c$ for the spectrum of the CAP signal is determined. This is to be equal to or larger than the largest frequency for which the Fourier transform G(f) of g(t) is nonzero.

The impulse response of the in-phase filter 213 is defined as f(t). The impulse response of the quadrature filter 215 is the Hilbert transform, $\tilde{f}(t)$, of the impulse response of the in-phase filter 213. The Hilbert transform $\tilde{f}(t)$ provides an impulse response that is orthogonal to the original impulse response f(t). This is necessary to allow the addition of the output of the in-phase filter 213 and the quadrature filter 215 so that the data from each filter may be extracted at the receiver. The impulse response f(t) and its Hilbert transform $\tilde{f}(t)$ are defined as $f(t) = g(t) \cos 2\pi f_c t$ and $\tilde{f}(t) = g(t) \sin 2\pi f_c t$. Note the multiplication of the function g(t) by a cosine function in f(t) and a sine function in $\tilde{f}(t)$ will modulate the signal to the carrier frequency $f_c$. Thus g(t) can be thought of as the baseband signal.

The coefficients of the in-phase and quadrature filters 213 and 215 (which are finite-impulse-response filters) are determined by plugging in discrete values of time into the formulas for the impulse response function f(t) and its Hilbert transform $\tilde{f}(t)$. Assuming $c_i$ and $d_i$ are the values of the $i^{th}$ tap coefficient 251 of the in-phase and quadrature filters 213 and 215, respectively, the values of the tap coefficients are then computed by $c_i = g(iT)[\cos(2\pi f_c iT)]$ and $d_i = g(iT)[\sin(2\pi f_c iT)]$. There may be up to 180 different coefficients used in both the in-phase filter 213 and the quadrature filter 215. It would be possible to use more or less coefficients depending upon the desired frequency response.

The coefficients the in-phase filter 213 and the quadrature filter 215 are found by first specifying the excess bandwidth $\alpha$ as well as the center frequency $f_c$ of the equation g(t) of the ultimate band in which transmission of data is to take place.

Next a value is chosen for symbol period T' with which to calculate filter coefficients $c_i$ and $d_i$. The symbol period T' chosen is smaller than the actual symbol period T of the incoming signal. Although prior art systems are designed to minimize the bandwidth of the transmitted signal, the intentional use of T' as the symbol period in equation g(t) will result in an increase in the transmission bandwidth. There are certain advantages to be derived from the increased bandwidth as discussed below.

Figure 16:
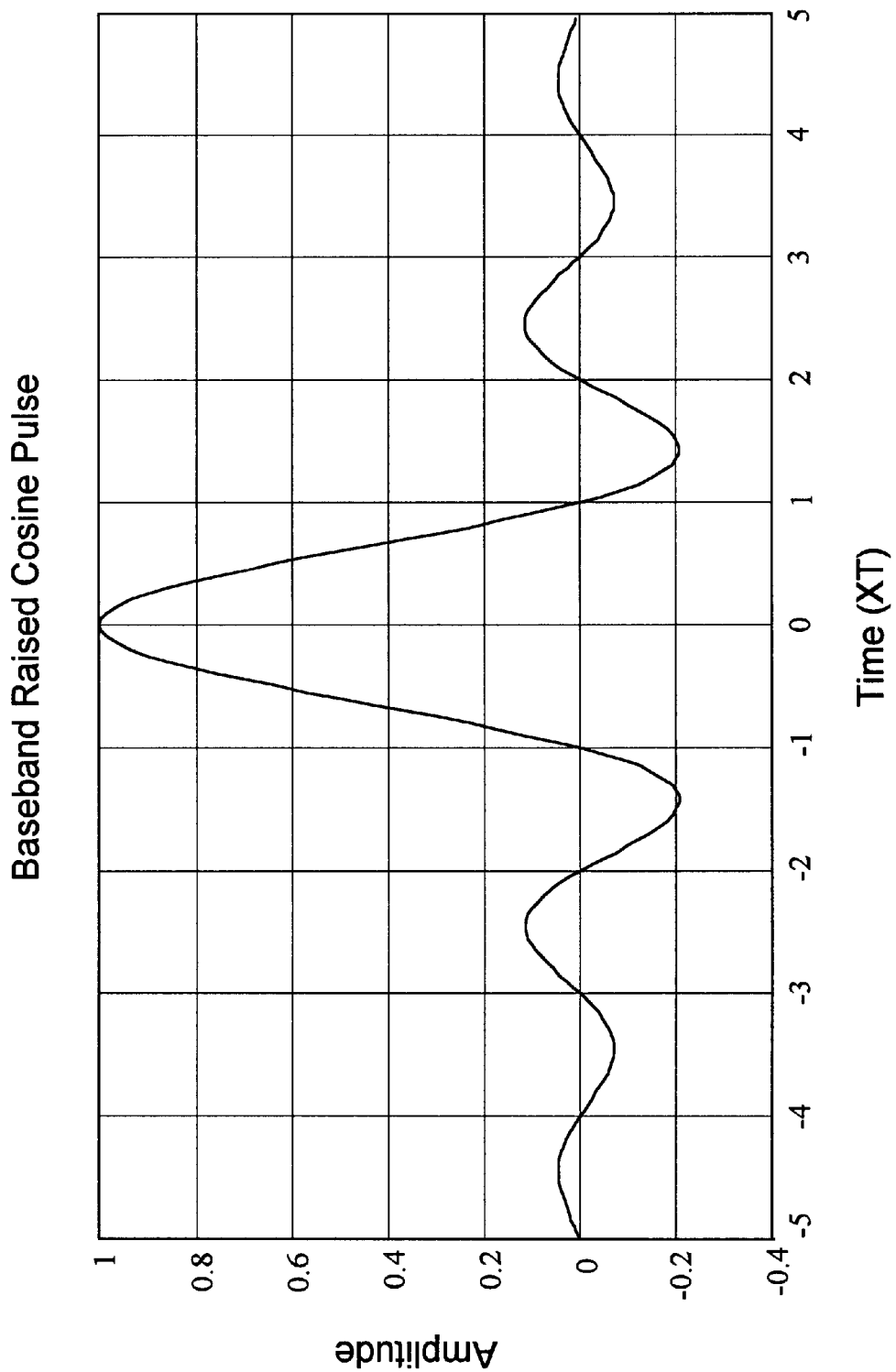
FIG. 16 is a graph of a baseband raised cosine shaping pulse used in calculating the coefficients of the in-phase and quadrature filters without bandwidth expansion.

To explain further, referring to FIG. 16, shown as an example is a graph of the baseband raised cosine impulse response h(t) where the symbol period used in the calculation of h(t) is the actual symbol period T of the in-phase signal 229 (FIG. 15). Note that the curve crosses the zero axis at multiples of the symbol period T. Thus, this curve conforms with the Nyquist criterion. In particular, where samples of the in-phase and quadrature signals 229 and 231 are shaped by this curve, the transmission bandwidth is at a minimum.

Figure 17:
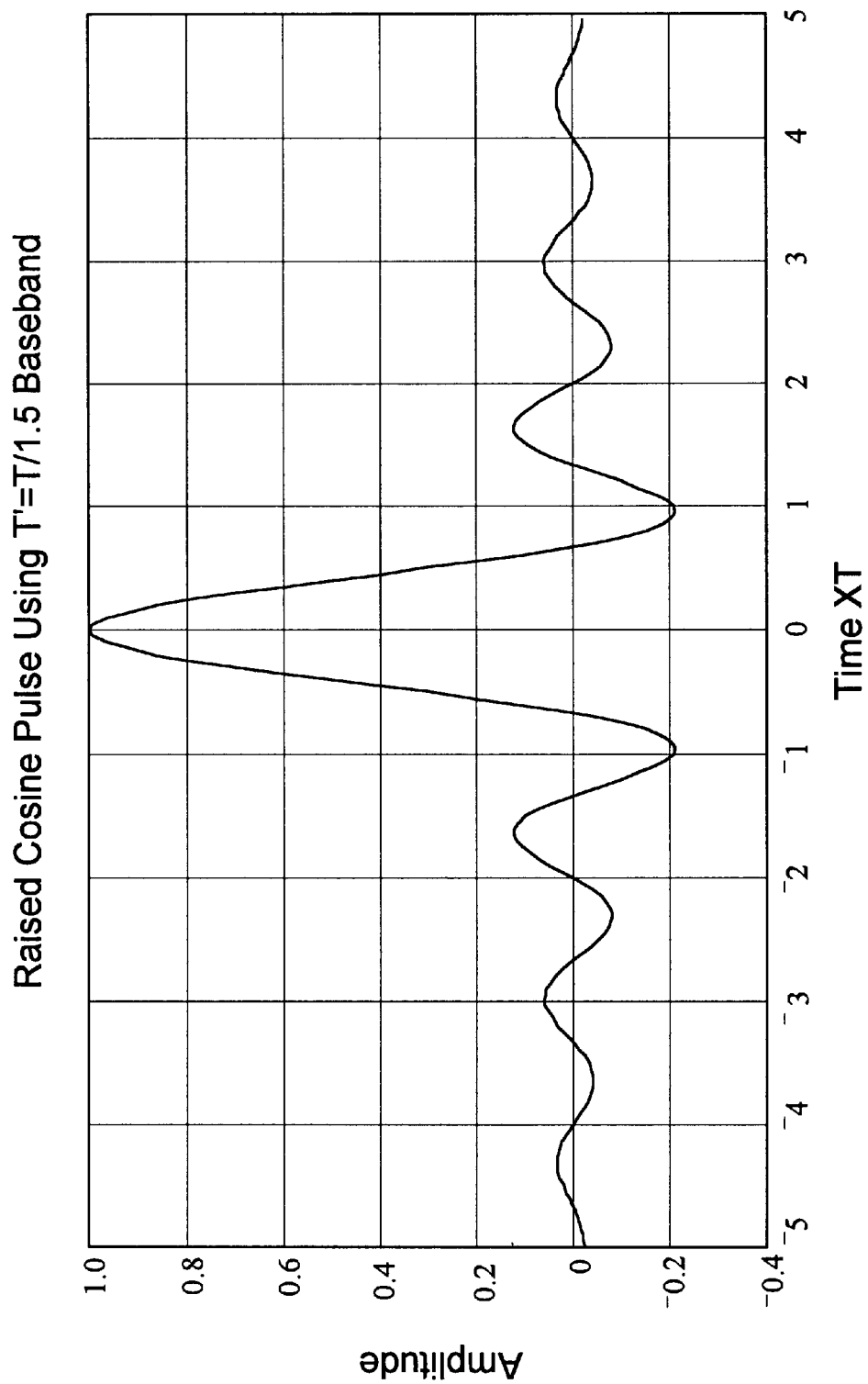
FIG. 17 is a graph of a baseband raised cosine shaping pulse used in calculating the coefficients of the in-phase and quadrature filters with bandwidth expansion according to the preferred embodiment.

Turning now to FIG. 17, we see an example of the baseband impulse response of the in-phase filter 213. As before, the impulse response h(t) is defined as a raised cosine. However, a value T' is used in place of the actual symbol period in the calculation of h(t) which is less than the actual symbol period T of the in-phase and quadrature signals 229 and 231. The result is an increase in transmission bandwidth.

Thus, the coefficients $c_i$ of the in-phase filter 213 (FIG. 12) are determined by $c_i = g(iT')[\cos(2\pi f_c iT')]$ which correspond to discrete points along the impulse response curve f(t). Likewise, the coefficients $d_i$ for the quadrature filter 215 (FIG. 12) are determined by $d_i=g(iT)[\sin(2\pi f_c iT)]$. Each coefficient is known as a "tap". There may be up to 180 taps for both the in-phase and quadrature filters 213 and 215, although more or less may be used.

Figure 18:
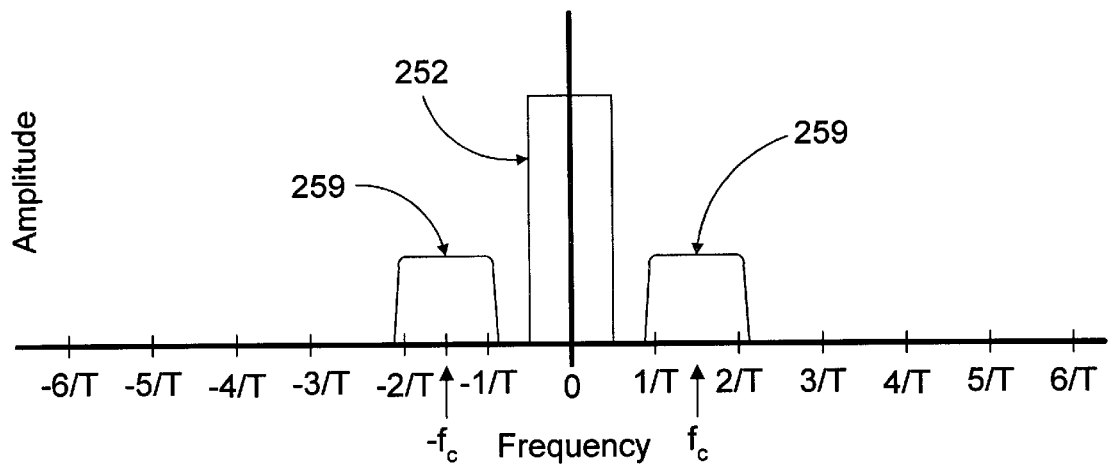
FIG. 18 is a frequency plot illustrating the transmit spectrum without bandwidth expansion.
Figure 19:
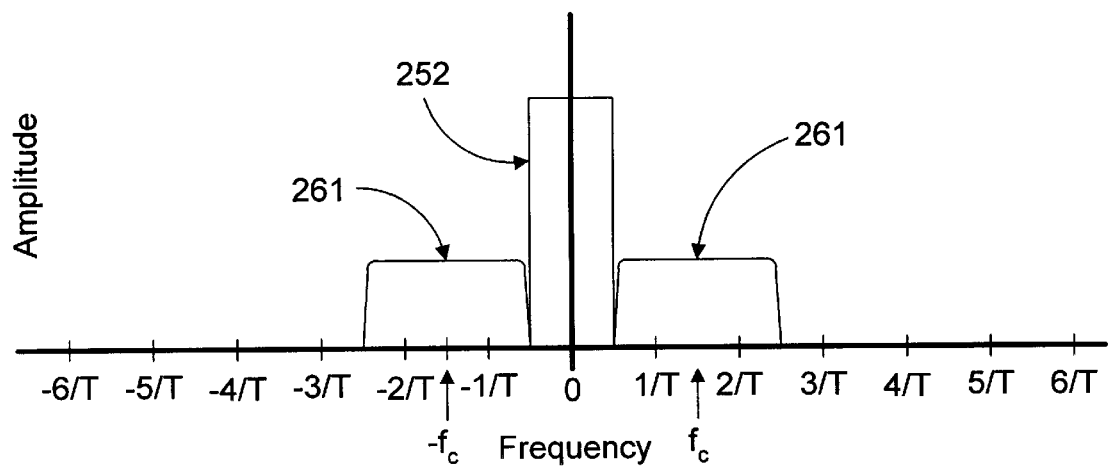
FIG. 19 is a frequency plot showing the transmit spectrum with bandwidth expansion according to the preferred embodiment.

Referring next to FIG. 18, shown in the frequency spectrum is the nominal bandwidth 259 which results from using the actual symbol period T in calculating the impulse response f(t). FIG. 19 illustrates the expanded bandwidth 261 that results from using the value T' in calculating the impulse response f(t). In effect, the use of T' in place of the actual symbol period T in calculating the coefficients of the in-phase and quadrature filters 213 and 215 (FIG. 12) expands the bandwidth of the filtered signal in the frequency spectrum centered at the center frequency $f_c$ chosen. Thus, the expanded bandwidth 261 of transmission is obtained by processing the baseband signal by a filter with coefficients which were calculated using a symbol period T' which is less than the actual symbol period T (FIG. 15) of the unfiltered signal, as opposed to the bandwidth of a signal processed by a filter with coefficients which were calculated using the symbol period T (FIG. 15) of the unfiltered signal. The expanded bandwidth is made of a signal with significant inter-symbol interference.

The actual value chosen for T' is approximately 0.9T. However, it is understood that T' may be anything less than T limited only by the amount of bandwidth expansion one wishes to achieve being cognizant of the fact that a more expansive bandwidth requires greater energy to transmit. Also, the capabilities of the receiving modem 225 may limit the allowable bandwidth expansion.

Figure 20A:
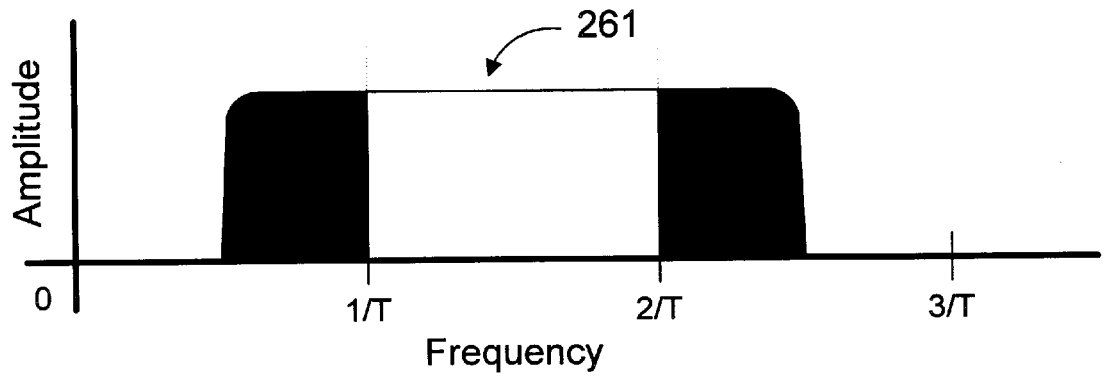
FIG. 20A is a frequency plot illustrating an expanded bandwidth according to the preferred embodiment showing the added bandwidth.

Turning to FIGS. 9A through 9C, shown is an example of the expanded bandwidth 261 as it is processed by the receiving modem 225 (FIG. 12) with dynamic equalization. In FIG. 20A, the center section of the expanded bandwidth 261 is 1/T wide as would be the case without the expansion of the bandwidth. The cross-hatched sections A and B represent the extent to which the bandwidth has been expanded. Upon receiving the signal with the expanded bandwidth 261, the dynamic equalization in the receiving modem 225 will sample at several times the original symbol rate. However, the dynamic equalization will ultimately produce one sample per symbol.

Figure 20B:
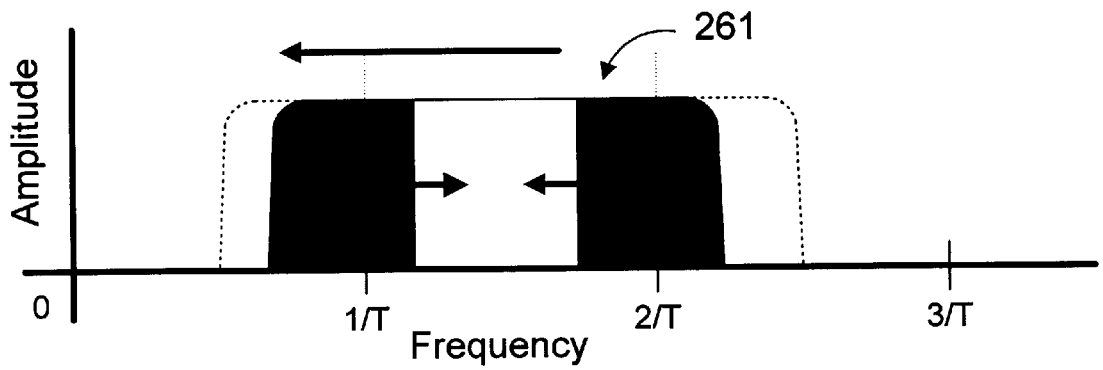
FIG. 20B is a frequency plot showing the effect on the expanded bandwidth of FIG. 20A after processed by a receiver.
Figure 20C:
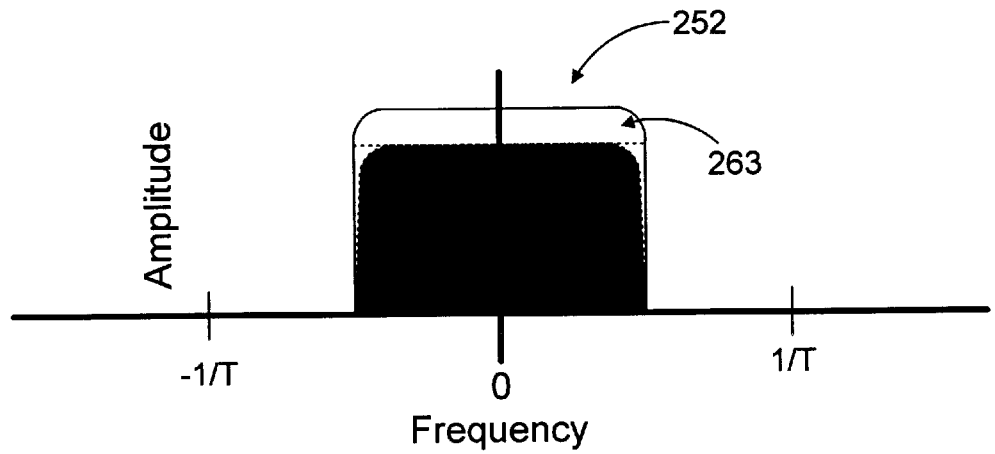
FIG. 20C is a frequency plot showing the transmit spectrum as received by the receiver with the resulting increase in signal strength.

Turning to FIG. 20B, shown is the effect on the bandwidth as seen by the receiving modem 225. In the receiving modem 225, the transmitted signal received is subjected to a downsampling process in which aliasing causes the expanded ends A and B of the expanded bandwidth to shift up or down by 1/T. In a sense, expanded end A is shifted up in frequency by 1/T, and expanded end B is shifted down 1/T. Also, the entire expanded bandwidth is shifted down and ultimately is centered at the DC axis as in FIG. 20C. The end result is shown in FIG. 20C in which the expanded ends A and B rest within the center section of the expanded bandwidth 261 which in turn is centered at the DC axis of the frequency spectrum. Thus the ultimate result of the processing in the receiving modem 225 is that the baseband signal 252 is recovered along with the expanded ends A and B. In shifting, the expanded ends to their new positions, the end result is that the expanded ends A and B are added to the center section coherently. Ultimately, the amplitudes of the frequencies of the center section experience an increase 263 by 6 dB. as shown in FIG. 20C. Any noise accompanying the expanded ends is not added coherently as it is random in nature. Consequently, the overall signal to noise ratio of the originally transmitted signal 207 (FIG. 12) is increased accordingly. Where the bandwidth is expanded by one times the symbol rate 1/T, there will be a 6 dB. gain in the signal. For example, if one where to expand the bandwidth by 2.5 times, then half the baseband signal would experience a 12 dB. gain, and the remaining half would experience a 6 dB. gain.

The increase in the signal to noise ratio for the original signal provides an improvement which serves to reduce the problem of interference and signal degradation during transmission using the two wire pairs.

Thus, bandwidth expansion as discussed herein is compatible with existing prior art receiving modems 225 which employ dynamic equalization. The receiving modem 225 will downsample the transmitted signal at a predetermined rate and, ultimately produces a single sample per symbol. However, the predetermined sampling rate of the receiver is chosen to prevent the expanded bandwidth 261 from folding over onto itself.

Turning back to FIG. 19, to explain further, suppose that the receiving modem 225 samples the transmitted signal at the expanded bandwidth 261 at 6/T baud/sec. In such a case, the frequency band from 3/T to 6/T will "fold over" onto the band from 0 to 3/T due to aliasing as known to those skilled in the art. In the case of the expanded bandwidth 261, a sampling rate of 6/T at the receiving modem 225 is permissible as the expanded bandwidth 261 is not effected. On the other hand, suppose the receiving modem 225 samples the transmitted signal at 4/T baud/sec. In such a case, the frequency band from 2/T to 4/T will fold over onto the band from 0 to 2/T. In this situation, part of the expanded bandwidth 261 will fold over onto itself. This is impermissible. This means that both the center frequency $f_c$ and the amount of bandwidth expansion should be specified so that the expanded bandwidth is not placed at a position which is a multiple of one half of the sampling frequency of the receiving modem 225. This means that, in the case where the transmitted signal is sampled at 6/T baud/sec, the expanded bandwidth may be placed anywhere between 0 to 3/T, 3/T to 6/T, 6/T to 9/T, 9/T to 12/T and on.

Figure 21:
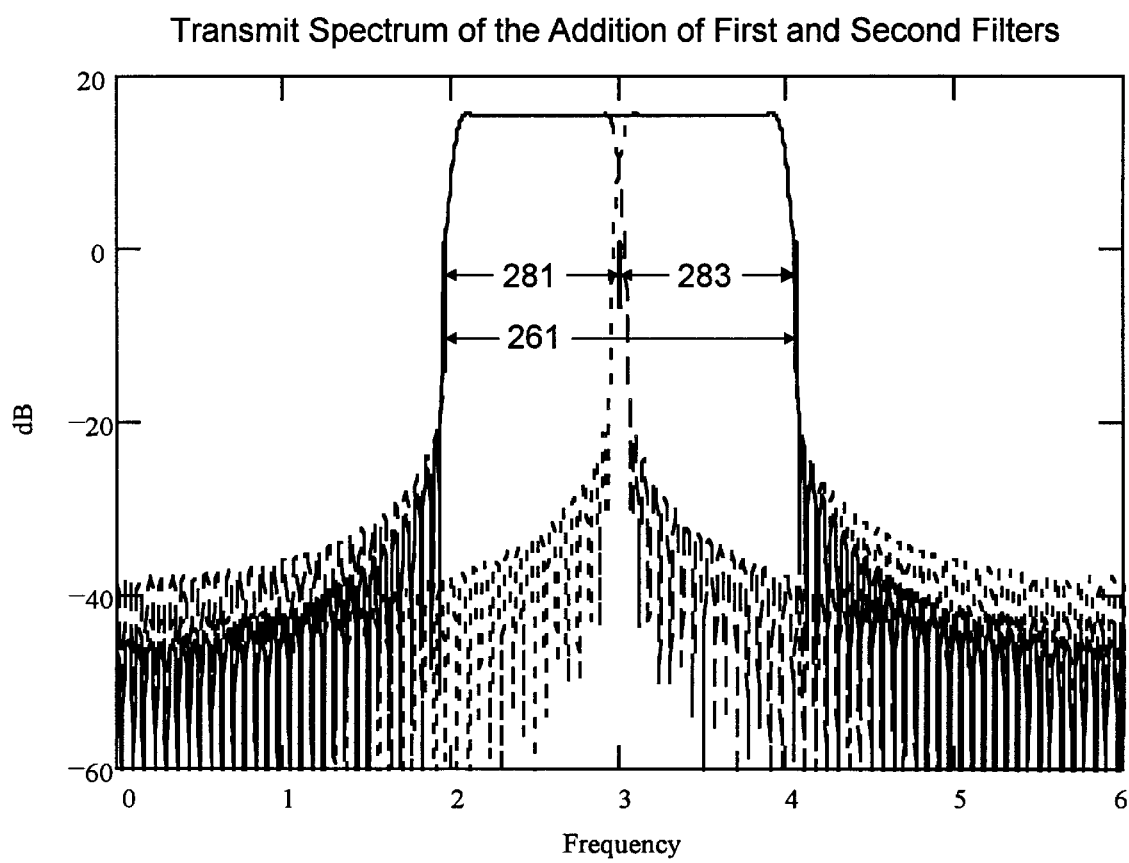
FIG. 21 is a frequency plot of the transmit spectrum of the second embodiment of the present invention.

Turning to FIG. 21, shown is a second approach by which bandwidth expansion may be accomplished by creating a first filter 281 and a second filter 283, each with a nominal bandwidth 259 (FIG. 18). The coefficients of the two filters are calculated so as to have center frequencies $f_c$ exactly one symbol rate 1/T apart. The coefficients are then added together into a single filter with an expanded bandwidth 261. With this approach, a flat inband response is achieved by using a raised cosine for the transmit filters 281 and 283 rather than a square-root raised cosine. In fact, one may use any other transmit filter that meets the Nyquist criterion. Generally, the Nyquist criterion are an expedient well known to those skilled in the art and will not be discussed in detail. A transmit filter that meets the Nyquist criterion will have rolloff regions which when added together will provide a flat response.

Figure 22:
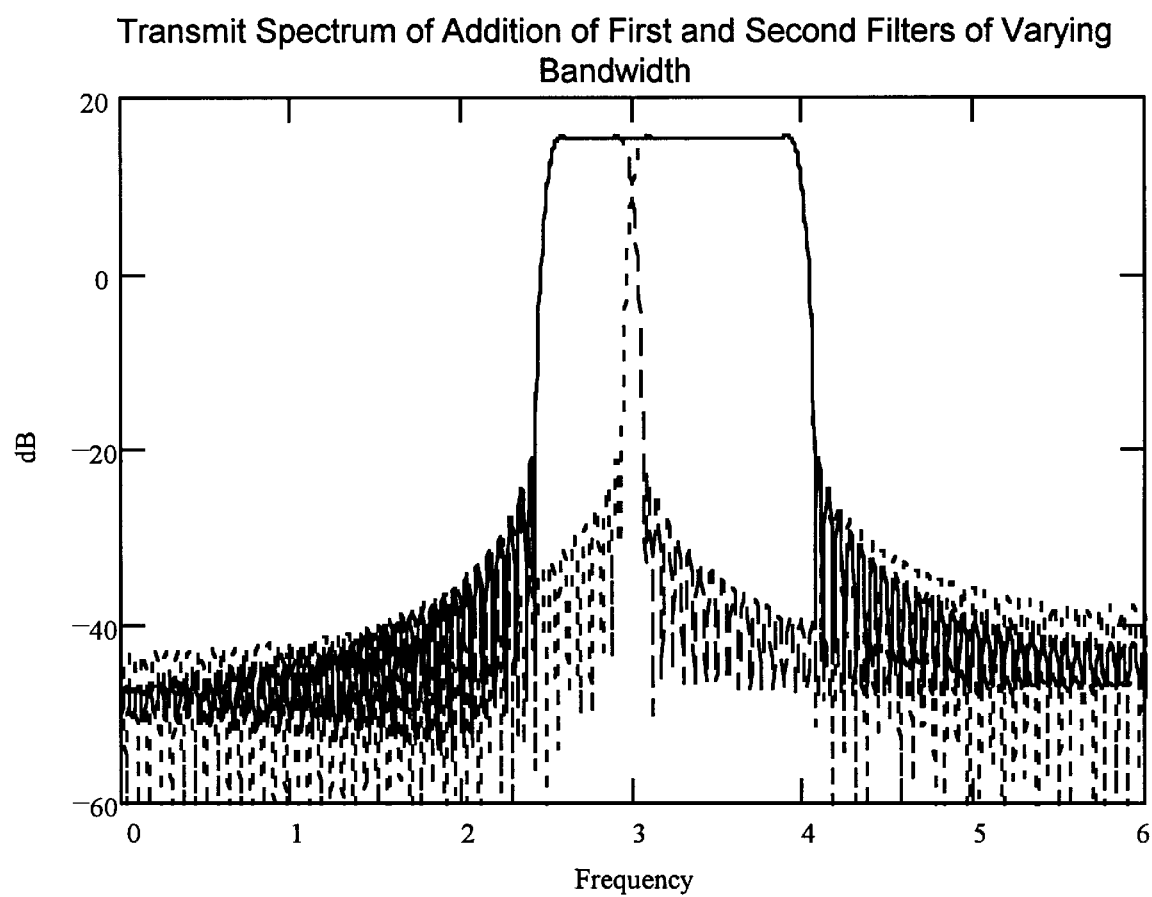
FIG. 22 is a frequency plot of the transmit spectrum of the third embodiment of the present invention.

Turning to FIG. 22, shown is yet another approach by which bandwidth expansion may be achieved. In particular, one may add a first filter 285 and a second filter 287 with different bandwidths where the difference between the center frequencies is equal to half the sum of the bandwidths. If the excess bandwidth of each of the two filters 285 and 287 is adjusted to have the same rolloff rate, one may also add the coefficients as in the second embodiment to achieve an expanded bandwidth. Note for example, if a first filter is half the bandwidth of the second filter, the first filter will need twice the excess bandwidth to achieve a flat response.

Note that in the case of the second and third approaches, the resulting coefficients of the in-phase and quadrature filters calculated by combining two separate filters as shown will be equal to those calculated according to the preferred embodiment.

In a fourth approach, one may create the transmit filters of the second or third approaches, except the two inband regions need not touch. This approach would be useful if there was interference between two good regions of the receive signal.

Figure 23:
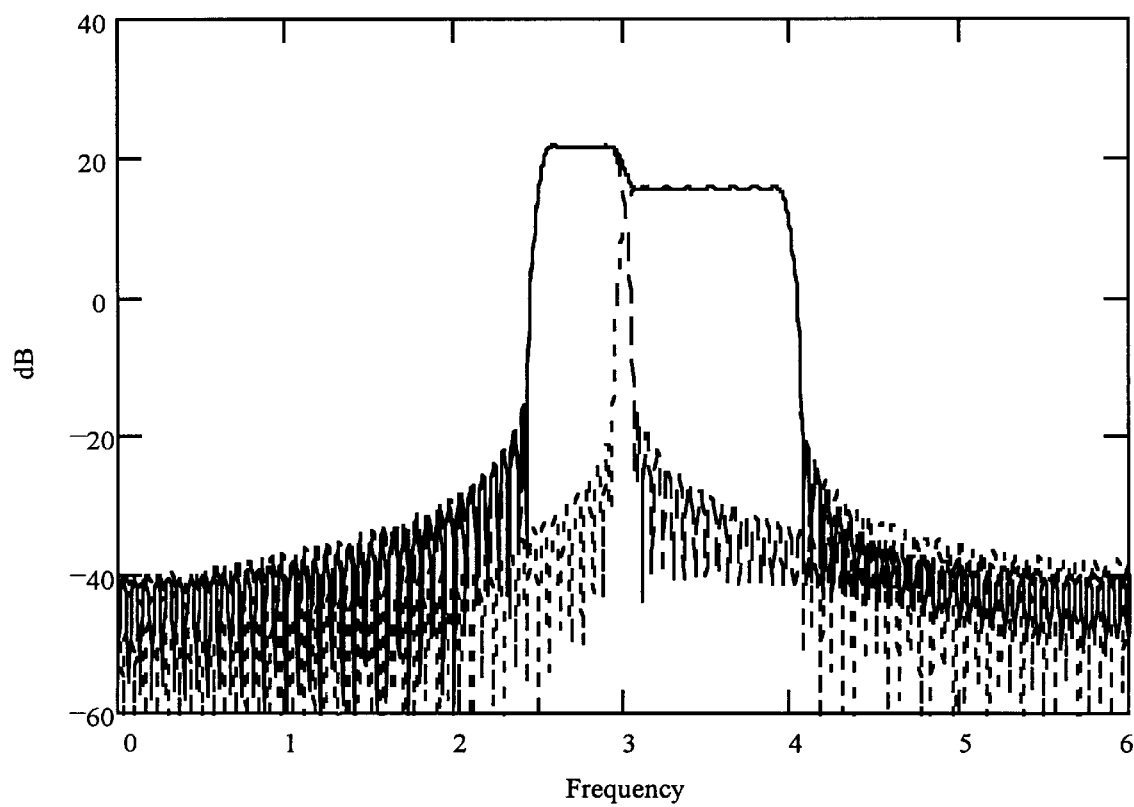
FIG. 23 is a frequency plot of the transmit spectrum of an alternative embodiment of the present invention.

Turning to FIG. 23, with regard to the second, third and fourth approaches, there is no reason why one or more of the added filters could have their magnitudes adjusted as shown, thus allowing a transmit spectrum of variable magnitude. Also, there is no restriction to merely two bands. The resulting transmit filter may comprise the addition of coefficients from several different bands. The foregoing approaches show some, but not all possible methods of expanding the bandwidth of a transmit spectrum.

Note that while the use of bandwidth expansion with quadrature amplitude modulation is detailed herein, it is understood that other approaches include the use of bandwidth expansion with pulse amplitude modulation. In particular, pulse amplitude modulation features a single digital filter to process an in-phase signal alone. Thus, the bandwidth expansion concepts discussed herein generally apply to the processing of a single in-phase signal with the exception that the pulse amplitude modulation signal is not modulated to a carrier frequency, but is centered at DC in the frequency spectrum. Specifically, one may calculate the coefficients for such a filter with a symbol period that is less than the actual symbol period of the data signal with pulse amplitude modulation as was the case with the quadrature amplitude modulation.

Many variations and modifications may be made to the preferred embodiment of the invention without departing substantially from the spirit and principles of the invention. All such modifications and variations are intended to be included herein within the scope of the present invention, as defined by the following claims.

It is claimed:

1. A system for clock recovery in a data communications device, comprising:
    a first processing engine adapted to generate a timing vector based on a stream of data;
    a second processing engine adapted to create a timing vector distribution based on the timing vector; and
    a third processing engine adapted to determine a quality of the timing vector based upon a graphical measurement of the timing vector distribution.

2. The system of claim 1, wherein the first processing engine further comprises a band edge timing vector generator.

3. The system of claim 1, wherein the first processing engine further comprises a pilot tone timing vector generator.

4. The system of claim 1, wherein the second processing engine further comprises:
    code adapted to sample the timing vector a predetermined number of times, thereby generating a number of sampled timing vectors; and
    a memory for storing the sampled timing vectors.

5. The system of claim 1, wherein the third processing engine further comprises:
    a memory; and
    code stored on the memory adapted to calculate an area of the timing vector distribution and to compare the area of the timing vector distribution to a predetermined threshold area of acceptance.

6. A system for clock recovery in a data communications device, comprising:
    means for generating a timing vector based on a stream of data;
    means for creating a timing vector distribution based on the timing vector; and
    means for determining a quality of the timing vector based upon a graphical measurement of the timing vector distribution.

7. The system of claim 6, wherein the means for generating a timing vector based on a stream of data further comprises a band edge timing vector generator.

8. The system of claim 6, wherein the means for generating a timing vector based on a stream of data further comprises a pilot tone timing vector generator.

9. The system of claim 6, wherein the means for creating a timing vector distribution further comprises:
    means for sampling the timing vector a predetermined number of times, thereby generating a number of sampled timing vectors; and
    means for storing the sampled timing vectors in memory.

10. The system of claim 6, wherein the means for determining a quality of the timing vector based upon a graphical measurement of the timing vector distribution further comprises:
    means for determining a length of the timing vector distribution;
    means for determining a width of the timing vector distribution;
    means for calculating the area of the timing vector distribution;
    means for comparing the area of the timing vector distribution to a predetermined threshold area of acceptance.

11. A system for clock recovery for a data communication system, comprising:
    means for generating a timing vector at a predetermined center frequency from a received data signal;
    means for sampling the timing vector, thereby generating a number of sampled timing vectors; and
    means for measuring a quality of the timing vector by evaluating the sampled timing vectors at the predetermined center frequency.

12. The system of claim 11, further comprising means for determining the predetermined center frequency for generating the timing vector from the received data signal.

13. The system of claim 11, wherein said means for generating a timing vector further comprises:
    an analog to digital (A/D) converter with an input and an output;
    a pair of band edge filters with inputs coupled to said A/D output, each of the band edge filters having an output; and
    a multiplier coupled to the outputs of each of the band edge filters, the multiplier having an output capable of transmitting a timing tone.

14. The system of claim 11, wherein the means for measuring a quality of the sampled timing vectors at the predetermined center frequency further comprises:
    means for measuring a distribution of the sampled timing vectors on a complex plane; and
    means for determining an acceptability of the timing vector based on the measurement of the distribution of the sampled vectors.

15. The system of claim 12, wherein the means for determining the predetermined center frequency for generating the timing vector from the received data signal further comprises means for determining the predetermined center frequency from a number of predetermined frequency values.

16. The system of claim 12, wherein the means for determining the predetermined center frequency for generating the timing vector from the received data signal further comprises:

means for determining a width of a frequency spectrum of the received data signal; and means for calculating a predetermined number of center frequencies within the frequency spectrum of the received data signal.

17. The system of claim 14, wherein the means for measuring a distribution of the sampled timing vectors further comprises:

means for determining a reference vector with an angle representative of a number of angles associated with the sampled timing vectors within the distribution of the sampled timing vectors on the complex plane;

means for determining a width and a length of the distribution of the sampled timing vectors, the width being perpendicular to the reference vector, and the length being parallel to the reference vector.

18. The system of claim 17, wherein the means for determining a reference vector further comprises means for determining an average vector from the sampled timing vectors.

19. The system of claim 17, wherein the means for determining the length of the distribution of the sampled timing vectors further comprises means for determining a magnitude of a longest vector from the sampled timing vectors.

20. The system of claim 17, wherein the means for determining the width of the distribution of the sampled timing vectors further comprises means for determining a perpendicular distance of each of the sampled timing vectors from an axis of the reference vector.

21. A system for clock recovery for a data communication system, comprising:

means for generating a timing vector from a predetermined pilot tone at a predetermined frequency in a received data signal;

means for sampling the timing vector, thereby generating a number of sampled timing vectors; and means for measuring a quality of the timing vector by evaluating the sampled timing vectors at the predetermined frequency.

22. The system of claim 21, further comprising means for determining the predetermined pilot tone from a plurality of existing pilot tones in the received data signal.

23. The system of claim 21, wherein the means for measuring a quality of the timing vector further comprises:

means for measuring a distribution of the sampled timing vectors on a complex plane; and means for comparing the distribution of the sampled timing vectors to a predetermined acceptable distribution to determine an acceptability of the timing vector.

24. A method for obtaining clock recovery comprising the steps of:

generating a timing vector at a center frequency from a received data signal;

sampling the timing vector, thereby generating a number of sampled timing vectors; and measuring a quality of the timing vector by evaluating the sampled timing vectors at said predetermined center frequency.

25. The method of claim 24, wherein the step of generating a timing vector further comprises the step of filtering the received data signal with a pilot tone band pass filter.

26. The method of claim 24, further comprising the step of determining the center frequency for generating the timing vector from the received data signal.

27. The method of claim 24, wherein the step of measuring a quality of the timing vector further comprises the steps of:

measuring a distribution of the sampled timing vectors on a complex plane; and determining an acceptability of the timing vector based on the distribution of the sampled timing vectors.

28. The method of claim 25, further comprising the step of determining a pilot tone from a plurality of timing tones in the received data signal.

29. The system of claim 26, wherein said step of generating a timing vector further comprises the steps of:

converting an analog data input into a digital output;

filtering the digital output with a pair of band edge filters; and generating a timing tone by multiplying the outputs of the band edge filters.

30. The method of claim 26, wherein the step of determining the center frequency for generating the timing vector from the received data signal further comprises the step of determining the center frequency from a number of predetermined frequency values.

31. The method of claim 26, wherein the step of determining the center frequency for generating the timing vector from the received data signal further comprises the steps of:

determining a width of a frequency spectrum of the received data signal; and calculating a predetermined number of potential center frequencies within the frequency spectrum of the received data signal.

32. The method of claim 27, wherein the step of measuring a distribution of the sampled timing vectors further comprises the steps of:

determining a reference vector with an angle representative of a number of angles associated with the sampled timing vectors within a distribution of the sampled timing vectors on a complex plane;

determining a width and a length of the distribution of the sampled timing vectors, the width being perpendicular to the reference vector, and the length being parallel to the reference vector.

33. The method of claim 32, wherein the step of determining a reference vector further comprises the step of determining an average reference vector from the sampled timing vectors.

34. The method of claim 32, wherein the step of determining a reference vector further comprises the step of determining a magnitude of a longest vector from the sampled timing vectors.

35. The method of claim 32, wherein the step of determining a width of the distribution of the sampled timing vectors further comprises the step of determining a perpendicular distance of each of the sampled timing vectors from an axis of the reference vector.

* * * * *